(12) United States Patent
Rubio Guivernau et al.

(10) Patent No.: US 9,354,040 B2
(45) Date of Patent: May 31, 2016

(54) SCANNING DEVICE FOR LOW COHERENCE INTERFEROMETRY

(75) Inventors: José Luis Rubio Guivernau, Madrid (ES); Eduardo Margallo Balbás, Madrid (ES)

(73) Assignee: Medlumics S.L., Madrid (ES)

( * ) Notice: Subject to any disclaimer, the term of this patent is extended or adjusted under 35 U.S.C. 154(b) by 143 days.

(21) Appl. No.: 14/118,629

(22) PCT Filed: May 18, 2012

(86) PCT No.: PCT/EP2012/059308
§ 371 (c)(1),
(2), (4) Date: Nov. 19, 2013

(87) PCT Pub. No.: WO2012/160005
PCT Pub. Date: Nov. 29, 2012

(65) Prior Publication Data
US 2014/0078510 A1 Mar. 20, 2014

(30) Foreign Application Priority Data

May 20, 2011 (ES) .................................. 201130818

(51) Int. Cl.
*G01B 9/02* (2006.01)
(52) U.S. Cl.
CPC ........ *G01B 9/02091* (2013.01); *G01B 9/02019* (2013.01); *G01B 9/02028* (2013.01); *G01B 9/02064* (2013.01); *G01B 9/02082* (2013.01)
(58) Field of Classification Search
CPC ........... G01B 9/02019; G01B 9/02028; G01B 9/02064; G01B 9/02082; G01B 9/0209; G01B 9/02091; G02B 26/08; G02B 6/35; G02B 6/354; G02B 6/3544; G02B 6/3546; G02B 6/356; G02B 6/2938; G02B 6/29389; G02B 6/2861; G02B 6/3548
See application file for complete search history.

(56) References Cited

U.S. PATENT DOCUMENTS

| 6,198,540 B1 * | 3/2001 | Ueda et al. ..................... 356/479 |
| 8,655,431 B2 | 2/2014 | Joos et al. |

(Continued)

FOREIGN PATENT DOCUMENTS

| EP | 1780530 | 5/2007 |
| WO | WO 2004-073501 | 9/2004 |
| WO | WO 2010-134624 | 11/2010 |

OTHER PUBLICATIONS

Yamanari et al., "Full-range polarization-sensitive swept-source optical coherence tomography by simultaneous transverse and spectral modulation," Optics Express vol. 18, Issue 13, 2010; pp. 13964-13980.

Schmitt, J.M., "Array detection for speckle reduction in optical coherence microscopy," Phys. Med. Biol. vol. 42, Issue 7, 1997; pp. 1427-1439.

(Continued)

*Primary Examiner* — Michael A Lyons
(74) *Attorney, Agent, or Firm* — Sterne, Kessler, Goldstein & Fox P.L.L.C.

(57) ABSTRACT

A system for lateral scanning of a sample using optical coherence tomography is presented. The low coherence interferometry system includes a first multiplexing unit and a second multiplexing unit. The first multiplexing unit is configured to receive a first beam of radiation and includes a first plurality of optical delay elements configured to introduce a group delay to the first beam of radiation based on an optical path traversed by the first beam of radiation among a first plurality of optical waveguides. The second multiplexing unit is configured to receive a second beam of radiation. The second multiplexing unit includes a second plurality of optical modulating elements configured to differentiate the second beam of radiation among a second plurality of optical waveguides to produce one or more output radiation beams. The second plurality of optical waveguides is configured to guide the one or more output radiation beams towards a sample.

37 Claims, 21 Drawing Sheets

(56) References Cited

U.S. PATENT DOCUMENTS

| | | |
|---|---|---|
| 8,712,506 B2 | 4/2014 | Courtney et al. |
| 2004/0208619 A1* | 10/2004 | Li et al. .................... 398/159 |
| 2006/0274320 A1* | 12/2006 | Caplan ...................... 356/491 |
| 2007/0278389 A1* | 12/2007 | Ajgaonkar et al. ......... 250/221 |
| 2008/0108867 A1 | 5/2008 | Zhou |
| 2009/0316159 A1* | 12/2009 | Scott ......................... 356/454 |
| 2012/0250028 A1* | 10/2012 | Schmitt et al. ............. 356/492 |

OTHER PUBLICATIONS

International Search Report directed to Int. Appl. No. PCT/EP2012/059308, mailed on Jul. 31, 2012; 3 pages.

Written Opinion of the International Searching Authority directed to Int. Appl. No. PCT/EP2012/059308, mailed on Nov. 20, 2013; 5 pages.

* cited by examiner

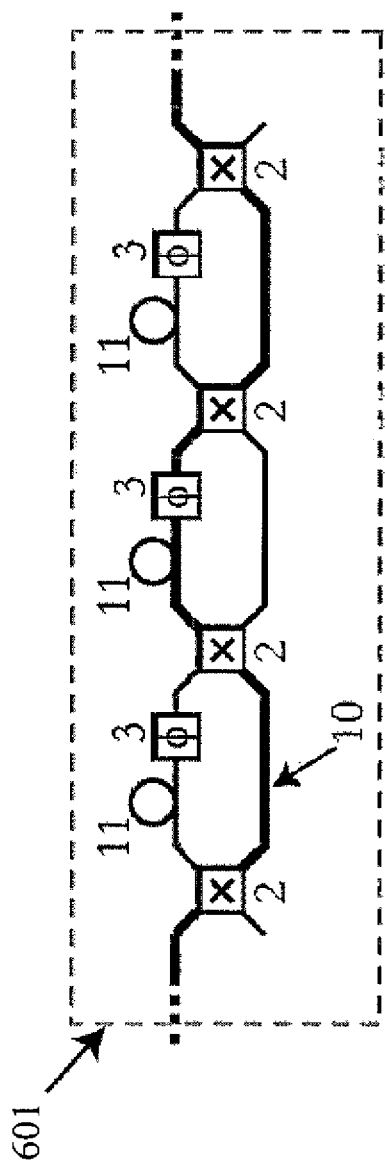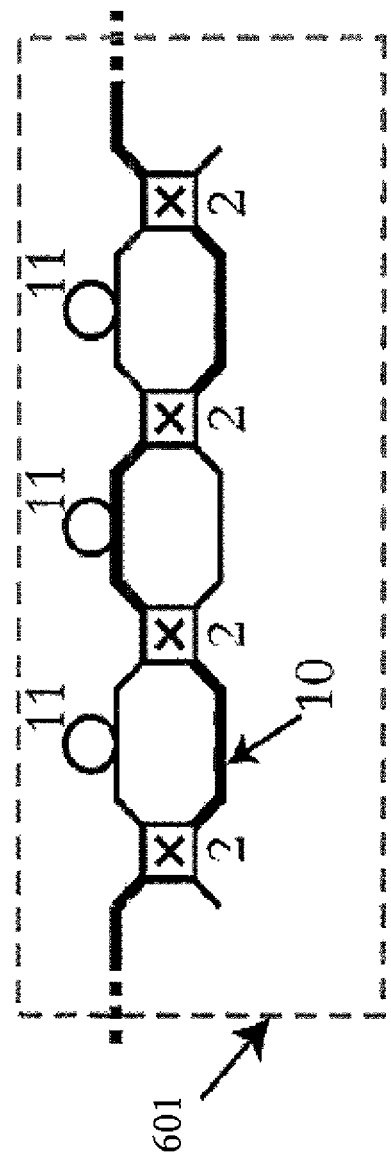

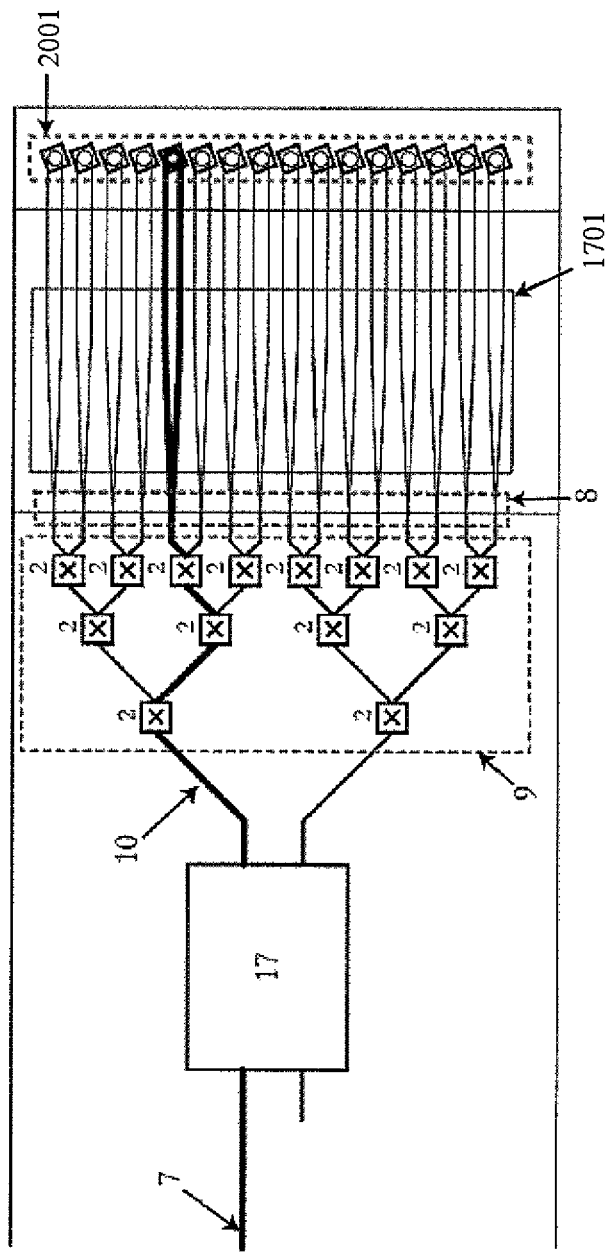
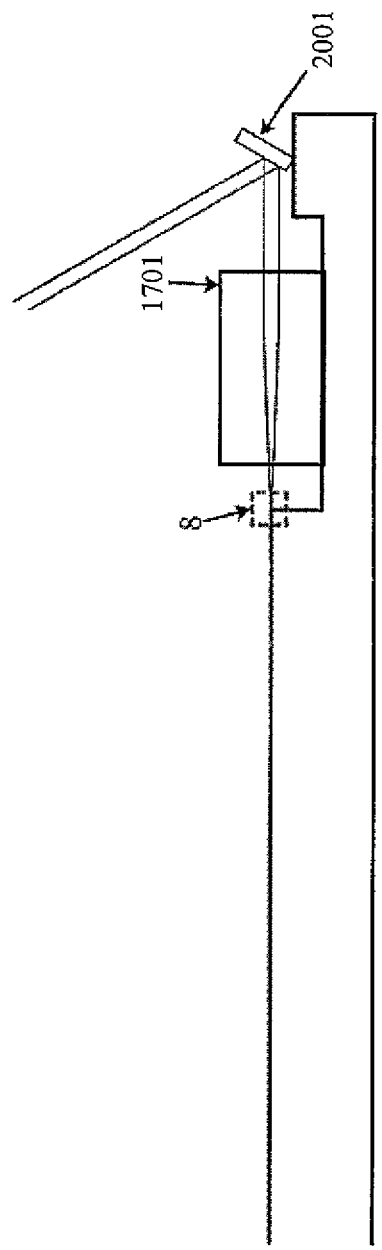
FIG. 20A
FIG. 20B

SCANNING DEVICE FOR LOW COHERENCE INTERFEROMETRY

FIELD

Embodiments of the invention relate to the fields of high-resolution optical coherence tomography.

BACKGROUND

Optical Coherence Tomography (OCT) is a technique for the generation of medical images that can provide axial information at a high resolution using a broadband light source and an interferometric detection system. It has found a wide range of uses, from cardiology to ophthalmology and gynecology, or for in-vitro sectional studies of biological materials.

Axial information is obtained in OCT through interferometric methods. To generate images (2D) and volume representations (3D) of the histology of tissue, it is necessary to move the beam laterally over the area of interest. This movement has been traditionally done by means of mechanical displacement of some optical element within the system such as the waveguide in the case of fiber-based systems. Alternatively, the sample can be moved underneath a stationary beam. The most common solution utilizes a moving mirror in the beam path in the sample arm of the interferometer. Although this method is effective, it has drawbacks, especially in terms of reliability, manufacturing cost, maintenance cost, complexity of adjustment, final system size, etc. The use of MOEMS technology (Micro-opto-electromechanical systems) has been proposed and demonstrated for situations in which conventional mirrors are not acceptable, such as in catheters or laparoscopic instruments. However, these devices suffer from many of the same problems as their macroscopic versions and they pose their own challenges in terms of encapsulation, sterilization, etc.

One approach for providing a lateral scan over a sample is to use multiple beams. An example of this was proposed in patent application WO 2010/134624. Several complete interferometers working in parallel are described that only share the light source. As such, the sample arm of every interferometer consists of a single optical path and there is no multiplexing mechanism leading to a structurally complicated system.

Another patent application, WO 2004/073501, contemplates the use of multiple beams that are simultaneously incident on the sample. The aim of this application is the combination of these beams in a controlled manner through the use of modulators and phase delays. The combined illumination over the sample shows a certain interference pattern. Working with the modulators and phase delay elements, the position of the interference pattern of the illumination on the sample can be varied and, subsequently, it is possible to reconstruct a three dimensional image of the sample using signal processing techniques. The application does not use multiplexing means to distinguish light collected from a plurality of optical paths. There is only a single optical path that collects the light reflected from the sample.

In an article by Yamanari et. Al, "Full-range polarization-sensitive swept-source optical coherence tomography by simultaneous transverse and spectral modulation," Optics Express Vol. 18, Issue 13, pp. 13964-13980, 2010, a polarization sensitive SS-OCT system (Swept Source OCT) is described. In this system, and with the aim of solving the problem of complex conjugates typical of SS-OCT and FD-OCT systems (Fourier Domain OCT), phase modulation is applied to the reference arm. This phase is modified while electro-mechanical means scan the sample laterally. This document, therefore, does not describe the use of modulation in the sample arm. Moreover, in the case of Time Domain OCT systems (TD-OCT), the scanning speed of the variable delay element in the reference arm can be a limitation of the final system performance, to the extent that its operating speed or maximum scanning range may be insufficient for the application of interest. U.S. Pat. No. 6,198,540 and patent application EP 1780530 each describe systems that use multiple optical paths in the reference arm. However, each system uses traditional free space optics and mechanical means for the lateral scan of the sample.

BRIEF SUMMARY

Systems and methods for performing low-coherence lateral scanning of a sample while minimizing (and in some embodiments eliminating) the use of mechanical elements is presented. In an embodiment, the system divides a sample arm into several optical paths and uses a plurality of outputs that send and receive beams to and from different areas of a sample, thus retaining the ability to differentiate at any time the light received from reflections at different depths within the sample.

According to an embodiment, a low coherence interferometry system includes a first multiplexing unit and a second multiplexing unit. The first multiplexing unit is configured to receive a first beam of radiation and includes a first plurality of optical delay elements. The first plurality of optical delay elements is configured to introduce a group delay to the first beam of radiation based on an optical path traversed by the first beam of radiation among a first plurality of optical waveguides. The second multiplexing unit is configured to receive a second beam of radiation. In an embodiment, the second beam of radiation is the same as the first beam of radiation. In another embodiment, the second beam of radiation is different from the first beam of radiation. The second multiplexing unit includes a second plurality of optical modulating elements. The second plurality of optical modulating elements is configured to differentiate the second beam of radiation among a second plurality of optical waveguides to produce one or more output radiation beams. The second plurality of optical waveguides is configured to guide the one or more output radiation beams towards a sample.

In an embodiment, a method includes receiving a beam of radiation at a first multiplexing unit. Then, a group delay is introduced to the beam of radiation received at the first multiplexing unit based on an optical path traversed by the beam of radiation received at the first multiplexing unit among a first plurality of optical waveguides in the first multiplexing unit. A beam of radiation is received at a second multiplexing unit. In an embodiment, the beam of radiation received at the second multiplexing unit is the same as the beam of radiation received at the first multiplexing unit. In another embodiment, the beam of radiation received at the second multiplexing unit is different from the beam of radiation received at the first multiplexing unit. The beam of radiation received at the second multiplexing unit is differentiated in the second multiplexing unit among a second plurality of optical waveguides to produce one or more output radiation beams. The one or more output radiation beams are guided towards a sample.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

FIGS. 4-6 illustrate examples of first multiplexing units, according to embodiments.

Figure 18A:
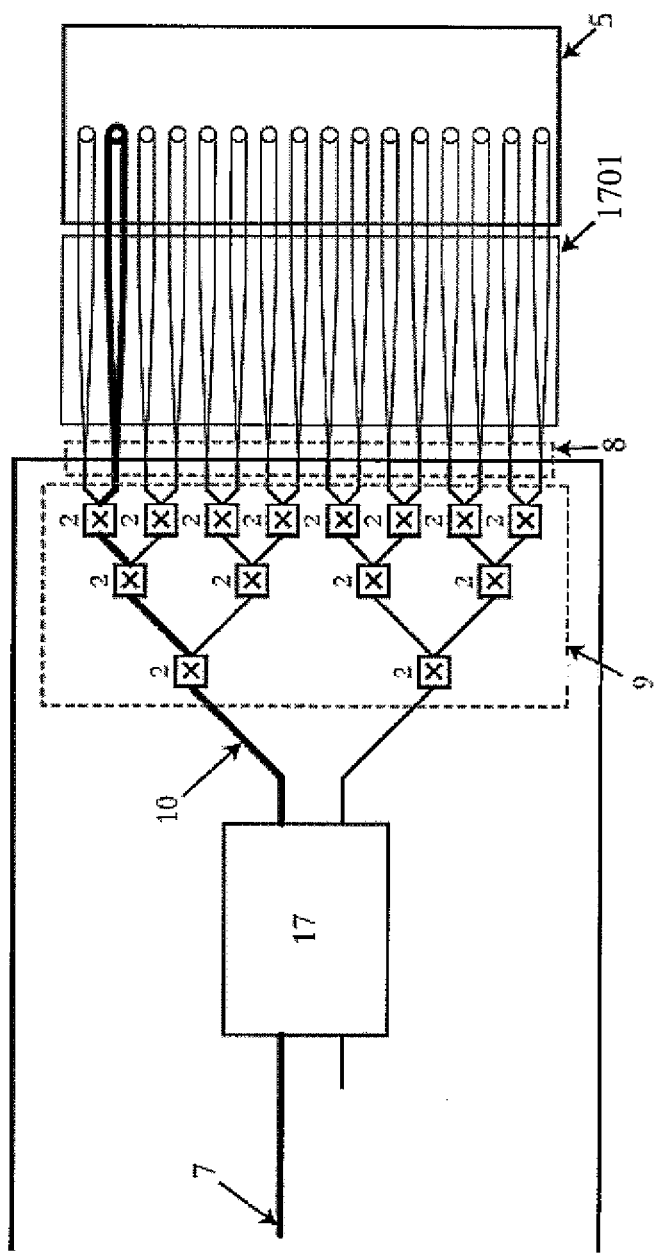
Figure 18B:
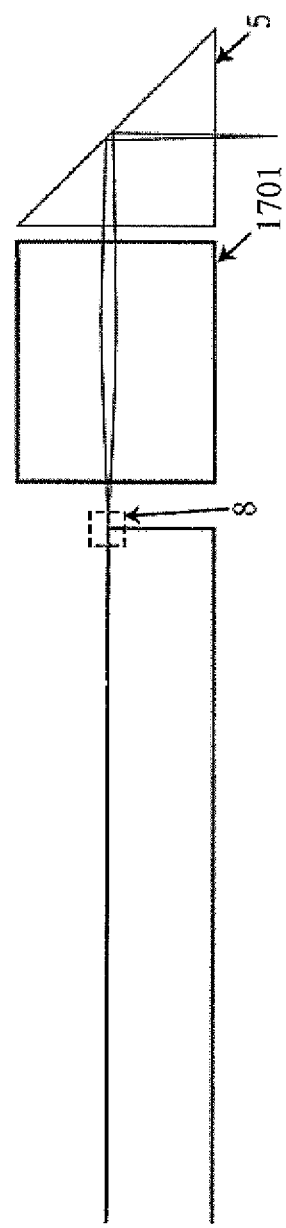

FIGS. 18A-B illustrate two views of a reflecting optical element with the multiplexing units, according to an embodiment.

FIGS. 19-20 illustrate the use of adjustable reflecting elements with the multiplexing units, according to embodiments.

Figure 21:
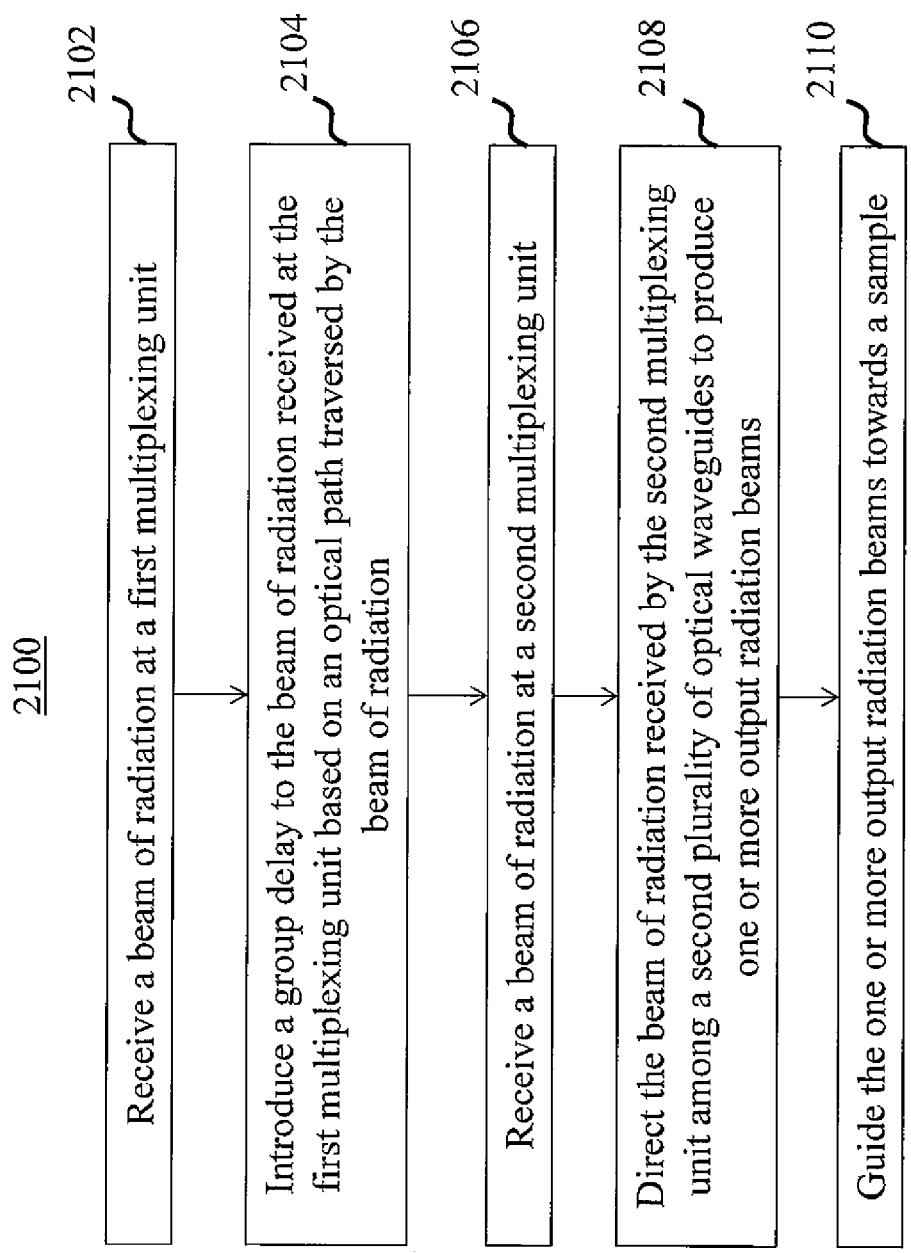

FIG. 21 illustrates a flowchart of an example method, according to an embodiment. Embodiments of the present invention will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

Embodiments described herein provide for sample scanning using optical coherence tomography (OCT) while avoiding or minimizing the use of mobile mechanical parts for the lateral displacement of the beam across the sample. Additionally, embodiments provide certain advantages such as an increase in the effectiveness of the axial scan. Spatial diversity schemes may be implemented by measuring the same sample region from different directions simultaneously, which reduces speckle and other types of noise in the measurements. Also, measurements of the scattering of light from the sample in different directions can be collected, thereby providing information about sample scattering anisotropy and directionality.

In various embodiments, different optical paths for a beam of radiation to travel are uniquely distinguished by means of multiplexing techniques that allow for the separation of different spatial positions during image processing. Any multiplexing technique may be applicable (time domain, frequency, code division, etc.). In one example, time domain multiplexing can be advantageously combined with other multiplexing techniques, such as frequency multiplexing. Discussed below is an example OCT system that includes multiplexing features to produce multiple output paths for the beam of radiation to travel.

Figure 1:
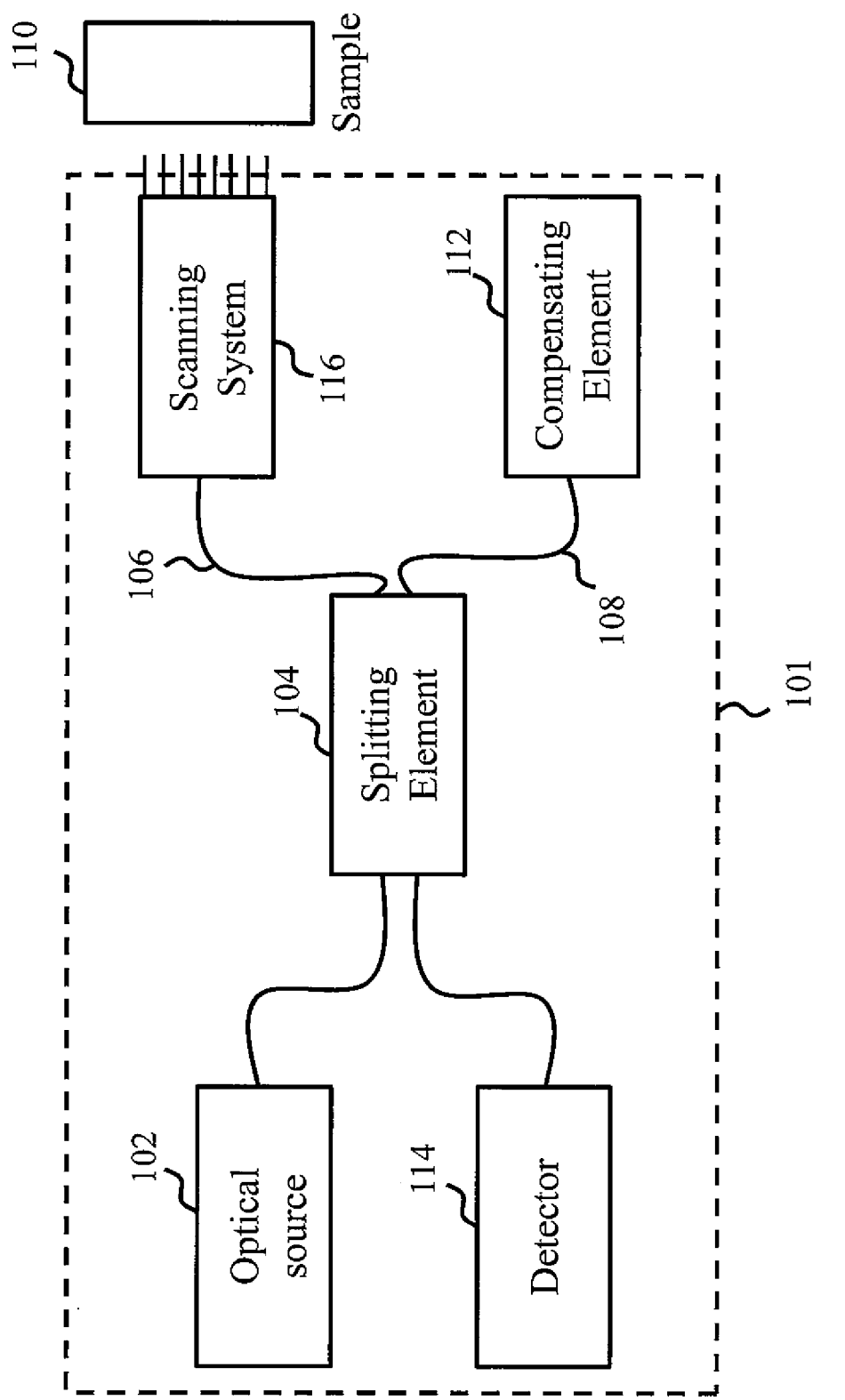
FIG. 1 illustrates a block diagram of an OCT system, according to an embodiment.

FIG. 1 illustrates an OCT system 101, utilizing an optical compensating element 112, and used for imaging a sample 110, according to an embodiment. For example, optical compensating element 112 may compensate for chromatic dispersion or any other type of aberration of the light within OCT system 101. In another example, compensating element 112 may merely reflect back incoming light without applying any particular modulation to the light. The use of the term "light" may refer to any range of the electromagnetic spectrum. In an embodiment, the term "light" refers to infrared radiation at a wavelength of about 1.3 µm. OCT system 101 further includes an optical source 102, a splitting element 104, a sample arm 106, a reference arm 108, a detector 114, and a scanning system 116. In the embodiment shown, compensating element 112 is located within reference arm 108, however, it should be understood that compensating element 112 may also be located in sample arm 106. Alternatively, compensating element 112 may be present in both sample arm 106 and reference arm 108. In one example, sample arm 106 and reference arm 108 are optical waveguides such as patterned waveguides or optical fibers. In an embodiment, all of the components of OCT system 101 are integrated onto a planar lightwave circuit (PLC). Other implementations may be considered as well, such as, for example, fiber optic systems, free-space optical systems, photonic crystal systems, etc.

It should be understood that OCT system 101 may include any number of other optical elements not shown for the sake of clarity. For example, OCT system 101 may include mirrors, lenses, gratings, splitters, micromechanical elements, etc., along the paths of sample arm 106 or reference arm 108. OCT system 101 may include various modulating elements configured to suppress contributions of interference signals generated in non-active optical paths. In another example, OCT system 101 may include MEMS (Micro Electro Mechanical Systems), which apply an additional physical lateral scan to the beams. An optical element in the path of the light may be displaced by electromechanical actuators (e.g. based on thermal expansion, piezoelectric or electrostatic force) that are integrated by means of microfabrication techniques.

Splitting element 104 is used to direct light received from optical source 102 to both sample arm 106 and reference arm 108. Splitting element 104 may be, for example, a bi-directional coupler, an optical splitter, or any other modulating optical device that converts a single beam of light into two or more beams of light.

Light that travels down sample arm 106 traverses scanning system 116 before ultimately impinging upon sample 110. Scanning system 116 may include one or more multiplexing units, with each unit differentiating the light among a plurality of optical paths. For example, scanning system 116 may include one multiplexing unit that selects an optical path associated with a particular group delay. The group delay applied to the light as it travels down the selected path determines a scan depth of the light in sample 110. In another example, scanning system 116 may include another multiplexing unit that differentiates the light among a plurality of output waveguides to produce one or more output radiation beams. The output radiation beams may impinge upon sample 110 at different regions on sample 110 and may be directed from different directions. More details regarding the various multiplexing units are discussed herein.

Sample 110 may be any suitable sample to be imaged, such as tissue. During an OCT procedure, the light scans at a certain depth within sample 110 and the scattered radiation is collected back into sample arm 106. In another embodiment, the scattered radiation is collected back into a different waveguide from the transmitting waveguide.

Light within sample arm 106 and reference arm 108 is recombined before being received at detector 114. In the embodiment shown, the light is recombined by splitting element 104. In another embodiment, the light is recombined at a different optical coupling element than splitting element 104.

In an embodiment, using scanning system 116 for various scan depths increases the performance of the rest of OCT system 101. Due to the various group delays applied to the light in scanning system 116, detected interference signals can be separated (in time, frequency, space, code, etc.,) for each scan depth at detector 114. OCT system 101 may be used with all varieties of scanning systems, including time domain, frequency domain and swept source.

In another embodiment, a subset of the output radiation beams is directed towards the same area of sample 110, so that measurements for that area are obtained from different directions. In this way, angular diversity can be used to reduce noise in the measurements as described in "Array detection for speckle reduction in optical coherence microscopy," J. M. Schmitt, Phys. Med. Biol. vol. 42, issue 7, 1997, the disclosure of which has been incorporated by reference herein in its entirety. Since the total distance traveled by each radiation beam of the subset will be different, the scanning depth may be independently controlled for each optical path.

In another embodiment, an angular scattering function of the light from sample 110 may be measured from directions differing from the incident direction, to provide valuable information about sample anisotropy. Such measurements are possible due to the plurality of output waveguides in scanning system 116 that can be configured to face the same region of sample 110. Additionally, the scanning depth may again be independently controlled for each optical path to account for any differences in light travel distance.

Figure 2:
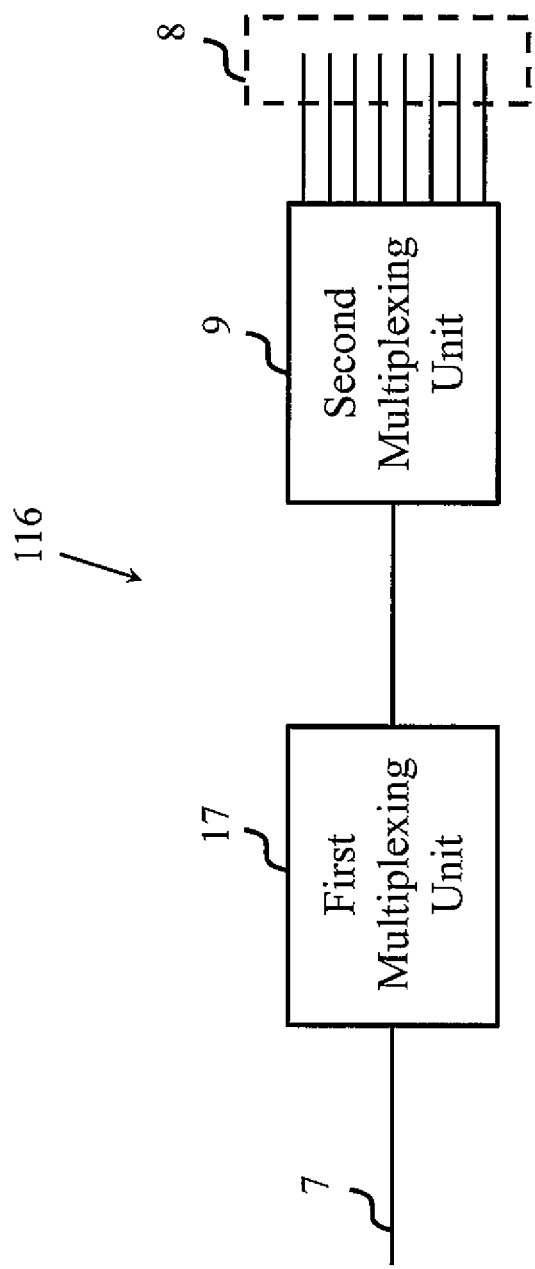
FIG. 2 illustrates a block diagram of a lateral scanning system, according to an embodiment

FIG. 2 illustrates a first multiplexing unit 17 and a second multiplexing unit 9, according to an embodiment. Each multiplexing unit may be a part of scanning system 116 illustrated in FIG. 1. First multiplexing unit 17 receives a beam of radiation from a waveguide 7. First multiplexing unit 17 applies a group delay to the beam of radiation based on a selected optical path within first multiplexing unit 17. In one example, the optical path is chosen based on time division multiplexing. In another example, the light is differentiated amongst a plurality of optical paths based on frequency division multiplexing. "Differentiating," as used herein, may refer to directing light down one or more specific optical paths (as may be the case with time division multiplexing, for example). "Differentiating," as used herein, may also refer to causing light traversing a given optical path to be distinguishable from light traversing other optical paths, even if light is traversing those optical paths at the same time (as may be the case with frequency division multiplexing or coherence division multiplexing, for example). More detailed examples of first multiplexing unit 17 are illustrated in FIGS. 4-7.

Second multiplexing unit 9 receives the beam of radiation from first multiplexing unit 17. Although only a single waveguide is illustrated connecting the two multiplexing units, it should be understood that any number of waveguides may be used to transfer light between the two multiplexing units. Second multiplexing unit 9 differentiates the received beam of radiation among a plurality of output waveguides 8 to produce one or more output radiation beams. In one example, this differentiation is performed via time division multiplexing. In another example, the differentiation is performed via frequency division multiplexing. In another example, the differentiation is performed via coherence domain multiplexing. It should be understood that any combination of the above mentioned techniques may be utilized as well to differentiate the beam of radiation among output waveguides 8. More detailed examples of second multiplexing unit 9 are illustrated in FIGS. 8-14.

Various embodiments describe at least one form of multiplexing between an input waveguide and one or more output waveguides to separate the different spatial positions at an image processing time. Any type of multiplexing (time division, frequency, coherence, code division, etc.) is applicable. Although embodiments herein may illustrate both first multiplexing unit 17 and second multiplexing unit 9 being a part of sample arm 106, it should be understood that this does not have to be the case. For example, in any of the preceding embodiments, first multiplexing unit 17 may be located in reference arm 108 while second multiplexing unit 9 is located in sample arm 106. In this example, first multiplexing unit modulates light in reference arm 108, while second multiplexing unit modulates light in sample arm 106.

Figure 3:
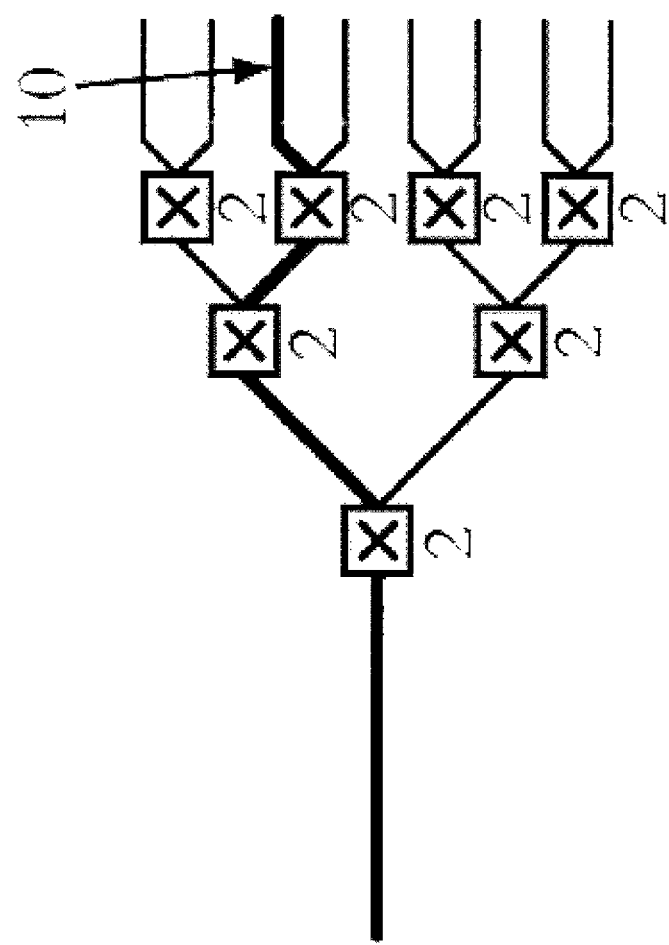
FIG. 3 illustrates an example of a time-division multiplexing unit.

FIG. 3 illustrates an example of light multiplexing for a relatively small number of outputs, but it may be considered analogous for a greater number as well. Each optical switch 2 deflects the light of an input waveguide to one of two output waveguides. Switch 2 can be implemented using integrated optical elements, such as Mach-Zehnder interferometers or 2×2 configurable couplers. Additionally, modulating elements such as electro-optic, thermo-optic and acousto-optic modulators may be implemented for directing the light between the various waveguides. In an embodiment, optical switches 2 are sufficiently broadband to perform efficiently on the entire light spectrum used in OCT system 101. FIG. 3 also illustrates one of the possible selectable optical paths 10 through the usage of switches 2.

According to an embodiment, scanning system 116 includes a multiplexing system for different ranges of depth scanning. One aim is to reduce the requirements on the axial scanning speed or its maximum range, or increase the actual scanning speed given some characteristics of the element in reference arm 108 of OCT system 101. High lateral scanning speeds can be reached using the multiplexing resources illustrated in FIG. 3.

FIGS. 4A and 4B illustrate two examples of first multiplexing unit 17, labeled 401 and 402, in the frequency domain for different depth scanning ranges through the insertion of delay elements 11. Delay elements 11 cause defined group delays in the light that passes through them in the different optical paths 10. Multiplexing units 401 and 402 further include modulating elements 3 used to differentiate the light, for example, in the frequency domain, among the various optical paths through delay elements 11.

The placement of delay elements 11 in multiplexing unit 401 each add a delay to their respective portion of the optical path. An optical path having a desired delay, such as optical path 10, can then be selected by adding appropriate delays together along the optical path. The placement of modulating elements 3 in multiplexing unit 402 modulates a relative decrease of added delay in each optical path 10. The goal is to produce a plurality of possible optical paths 10, each with a different total group delay. In this manner, a desired group delay can be implemented in the OCT system to image different depths without moving parts. In an example, each of these optical paths 10 is modulated using a characteristic frequency. Delay elements 11 may be implemented in a variety of ways, such as by using waveguide segments of different lengths or waveguide segments allowing modification of the refractive index by means of some effects such as thermo-optical, thermo-electric, charge injection, etc. The frequency modulation may be obtained by using modulating elements 3 with a linear behavior in the range [0,2π], as it appears in the interference signal that is collected at detector 114.

FIGS. 4A-4B show designs based on a sequence of cascaded couplers 5, such as 2×2 couplers, that are characterized by their conservative nature in terms of optical energy. Indeed, all the optical power is transmitted down the branching waveguides at each cascaded coupler 5 between elements. Despite the similarity of the design with a cascaded Mach-Zehnder interferometer, there are no interference effects taking place in the elements, as all relative introduced delays are much greater than the coherence length of the source.

In either multiplexing unit 401 or 402, for different scanning depth ranges shown in FIGS. 4A-4B, the goal is not to find a complete transformation of depth into frequency, but a multiplexing of depth ranges by means of frequency division. The complete transformation may cause some of the relative delays to be comparable to, or smaller than, the coherence length of the source, in which case interference effects would appear.

The division within the various possible optical paths 10 with different accumulated group delays may also be achieved by using, for example, time division multiplexing.

Figure 5:
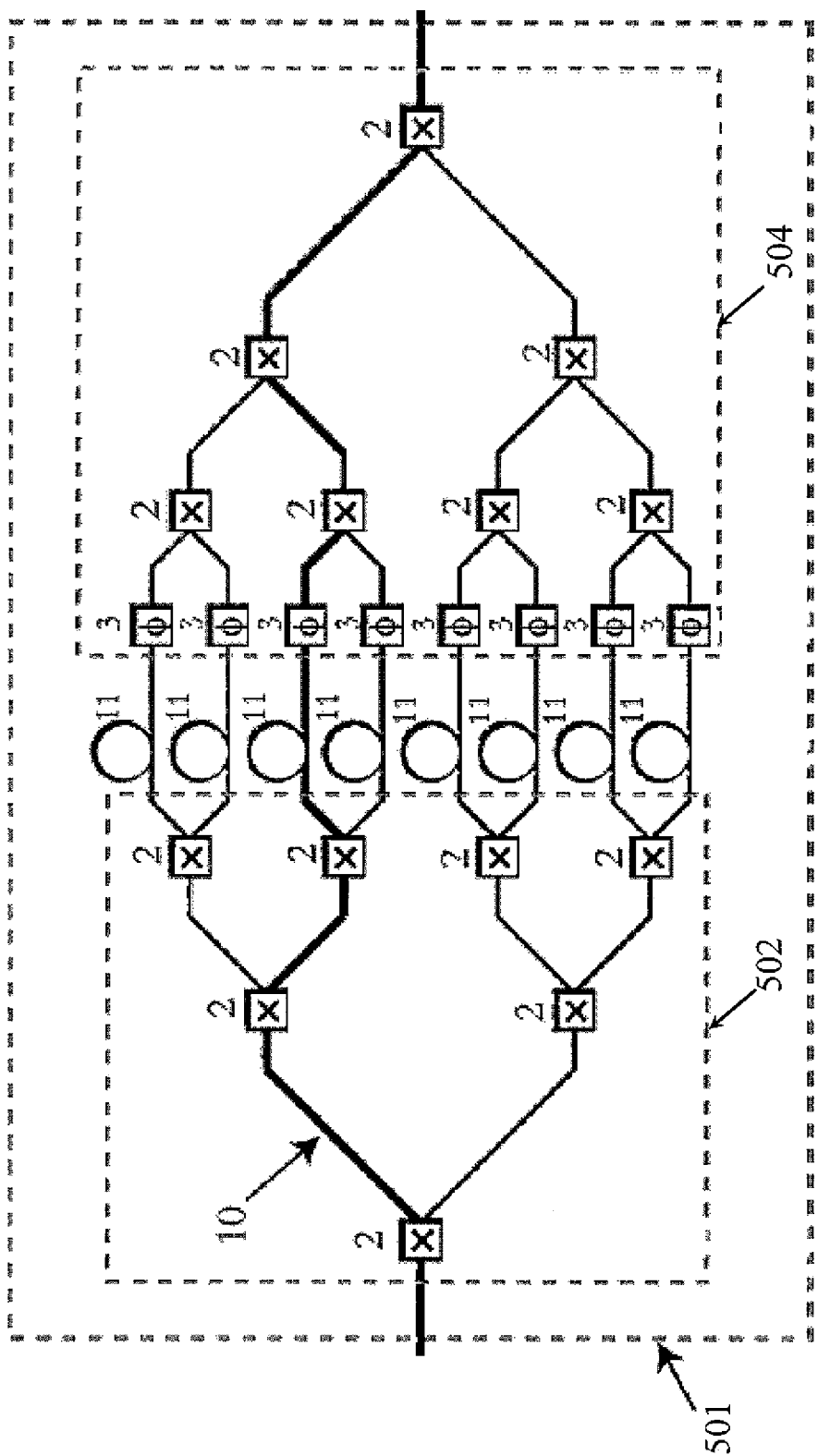

FIG. 5 illustrates another example of first multiplexing unit 17 (labeled 501) that includes optical switching elements 2 in a first network 502 and a second network 504. Multiplexing unit 501 further includes delay elements 11. In an embodiment, delay elements 11 are configured to apply different group delays depending on the selected optical path 10. In one example, second network 504 of optical switches 2 guides light from any of the plurality of possible optical paths 10 through delay elements 11 to a single waveguide output. Since optical switches 2 may not be ideal, some light may leak into paths other than the intended optical path 10. The noise generated by this leaked light may cause problems with the large dynamic range characteristics of the heterodyne detection systems commonly used in OCT. In an embodiment, to mitigate the situation regarding the leaked light, optical modulators 3 can be inserted on each optical path, such that they can individually modulate light on a given path. In one example, the modulation is performed via phase modulators. Thus, the light in optical path 10 is shifted in frequency with regard to the other optical paths, suppressing possible interferences. It should be understood that if optical switches 2 have a sufficiently high switching ratio, then optical modulators 3 may not be required.

The configuration shown in multiplexing unit 501 allows individual selection of group delays for each optical path 10, which can be useful to define different areas of scanning. In another embodiment, uniform spacing may be achieved over the scanning range by using a simpler design.

For example, another example of first multiplexing unit 17 is illustrated in FIGS. 6A-B (labeled 601). Multiplexing unit 601 is capable of selecting an optical path 10 with a unique group delay, but with a smaller number of delay elements 11 and optical switches 2 than the embodiment shown in FIG. 5. In one embodiment, optical modulators 3 may be included in each switchable optical path 10 as illustrated in FIG. 6A. In this way, selected optical path 10 is modulated, for example, at a unique frequency, so that the light can be filtered from other optical paths. Similar to the discussion above in regards to FIG. 5, if the switching technology is able to minimize the light that leaks into an undesired path, or if the interference is discarded from the signals through some other means, then optical modulators 3 may be removed. An example multiplexing configuration without optical modulators 3 is illustrated in FIG. 6B.

Figure 4:
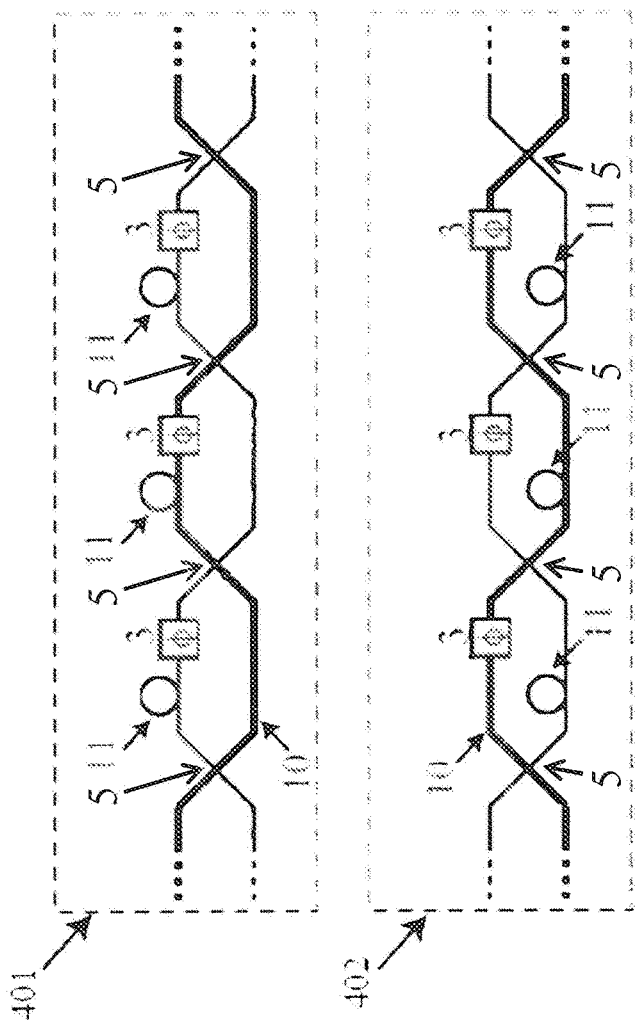

Time multiplexing systems have a possible advantage in terms of optical power efficiency. Although the use of first multiplexing system 17 for different ranges of depth scanning, such as the examples illustrated in FIGS. 4 and 6, is relatively efficient in terms of conservation of optical power, half of the optical power is lost at its output since there are two output waveguides. In an embodiment, a form of phase modulation is applied to the two output branches to allow for their separation in the frequency domain. Additionally, second multiplexing unit 9 may be included to receive the output from both branches. Time division multiplexing systems do offer an advantage, namely, the flexibility to select a particular scan region. For example, it is possible to obtain an image with interlaced depth ranges, giving higher priority to certain depth ranges of the image, which would be scanned more often than others, or even concentrate scanning time on a subset of all available ranges during operation.

In an embodiment, optical switches 2 may be designed to alternate between a balanced directional optical coupler and a proper switch. Thus, advantages of multiplexing in the frequency domain and the time domain could be combined. For example, optical switches 2 may be left in a state of balanced directional optical coupler to make various depth ranges be illuminated simultaneously, while other switches may be switched conventionally for sequential access of a particular optical path.

If optical switches 2 acting as couplers allow the distribution of energy between their branches in a controlled and flexible manner (e.g., with a variable division ratio), then it is possible to partition the amount of optical power used to sample at each depth. The power may be adjusted so as to obtain a uniform signal to noise ratio, or in another manner optimal for the specific application. Alternatively, this can be achieved in the time domain by adjusting the duration of the depth scan for each configuration of first multiplexing unit 17, or accumulating a variable number of lines depending on depth. The various time multiplexing embodiments may result in different period fractions being allotted to configurations of optical switches 2 belonging in different optical paths 10.

In an embodiment, multiplexing is introduced in some form to the separate contributions from both output branches of first multiplexing unit 17. For example, frequency modulation, time multiplexing, or introducing a differential delay in one of the branches that is larger than the scanning range are all multiplexing designs that may be implemented. In the last example, it may be necessary that there are no signals with significant magnitude coming from tissue depths greater than the scanning distance, to avoid interference between the branches.

Figure 7:
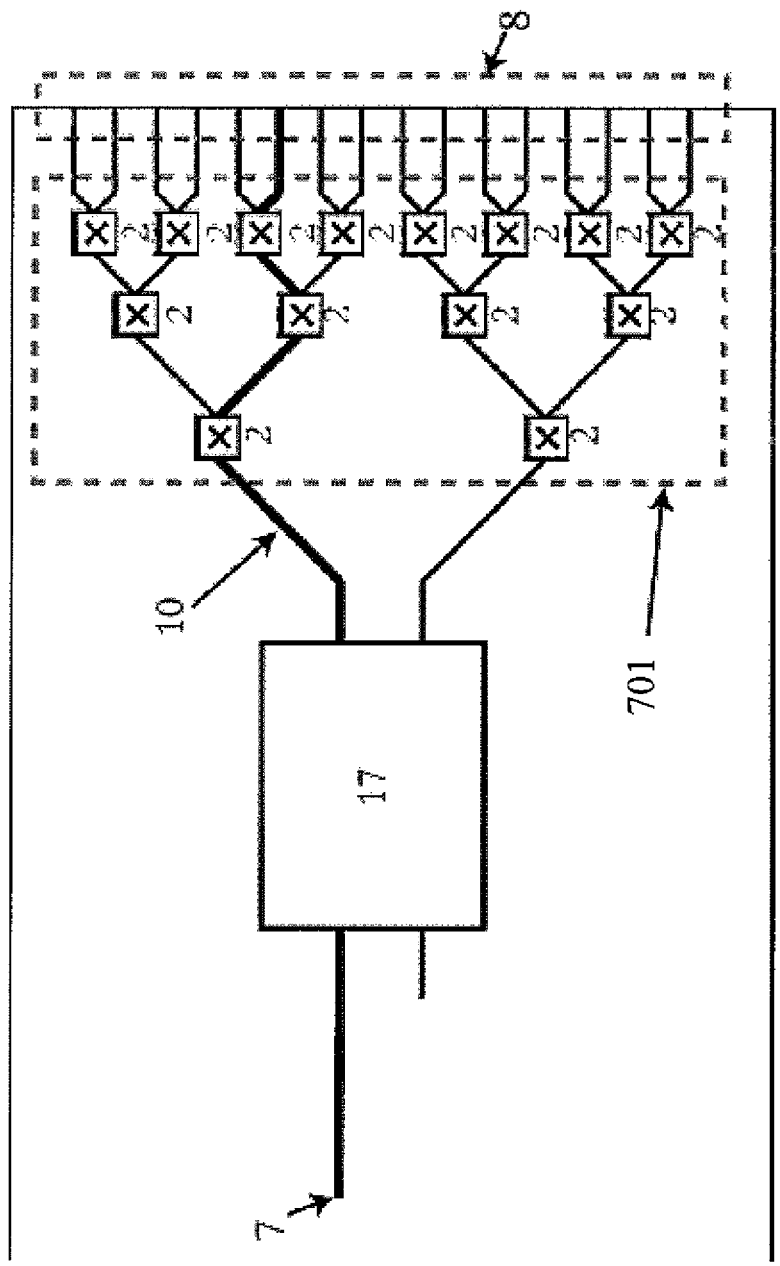
FIGS. 7-12 illustrate examples of second multiplexing units, according to embodiments.

FIG. 7 illustrates an example of second multiplexing unit 9 (labeled 701) using time division multiplexing, according to an embodiment. The illustrated system includes waveguide 7, output waveguides 8, first multiplexing unit 17 and multiplexing unit 701. FIG. 7 illustrates one possible combination of any scan range multiplex system with a time multiplex system for lines in the lateral direction. This maximizes the use of available light power and device signal to noise ratio. In this system, a desired optical path 10 may be selected using optical switches 2 to direct light to a particular waveguide 8. The paths may be sequentially selected, for example, to achieve a scanning functionality where light is passed through each waveguide 8 in a sequential manner.

Figure 8:
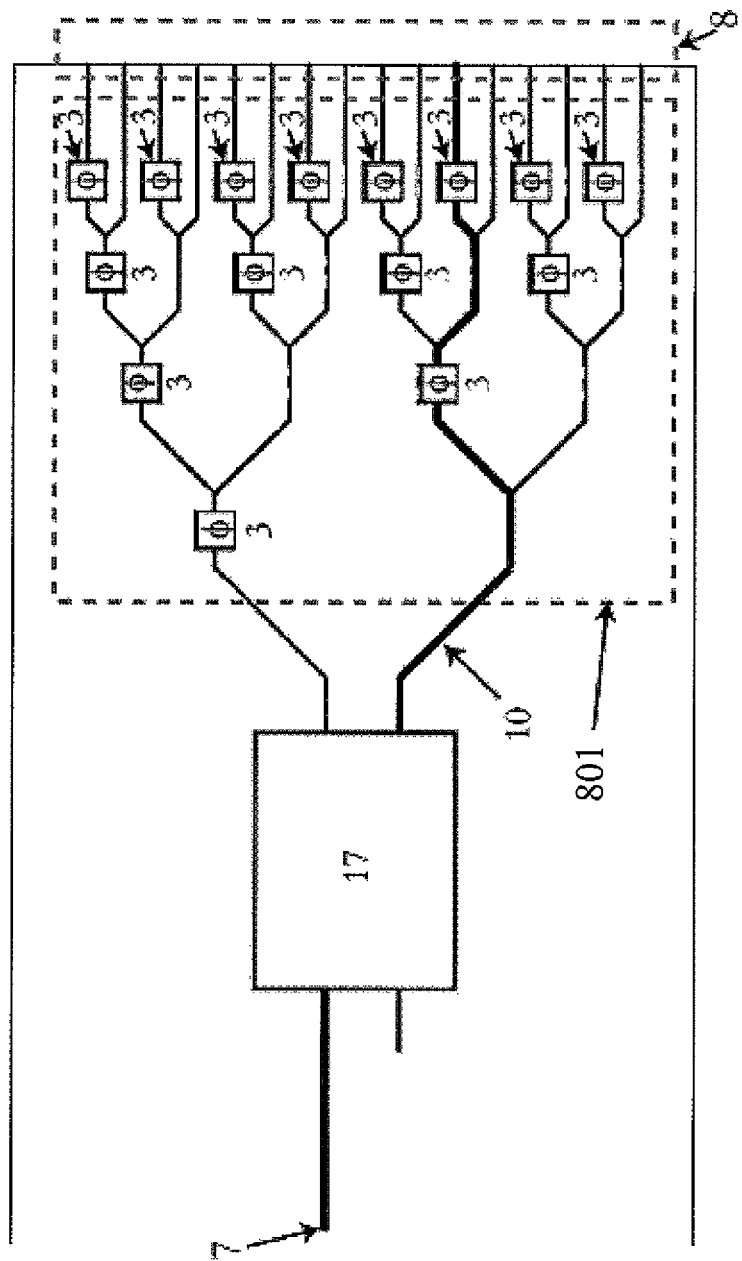

FIG. 8 illustrates an example where the time division multiplexing of second multiplexing unit 9 has been replaced by a frequency multiplexing unit 801. Frequency multiplexing unit 801 includes optical paths 10 associated with the different lateral scanning lines, according to an embodiment. Each branch of optical path 10 may have an associated optical modulator 3. In one example, a tree of directional couplers is used to split the incoming light among all optical paths. Frequency multiplexing unit 801 has a further advantage of allowing simultaneous detection of all lateral scanning lines. However, there does exist a loss of the light energy collected by each output waveguide 8 when traveling back through the tree of couplers. Assuming that the directional couplers are balanced and ideal, this approach presents excess losses of approximately $3*\log 2 (N)$ dB, where N is the number of branches of each tree of couplers, when compared with an equivalent time multiplexed system. As a result, a lower signal to noise ratio may be obtained in the present embodiment when compared, for example, to the time division multiplexing embodiment illustrated in FIG. 7.

Figure 9:
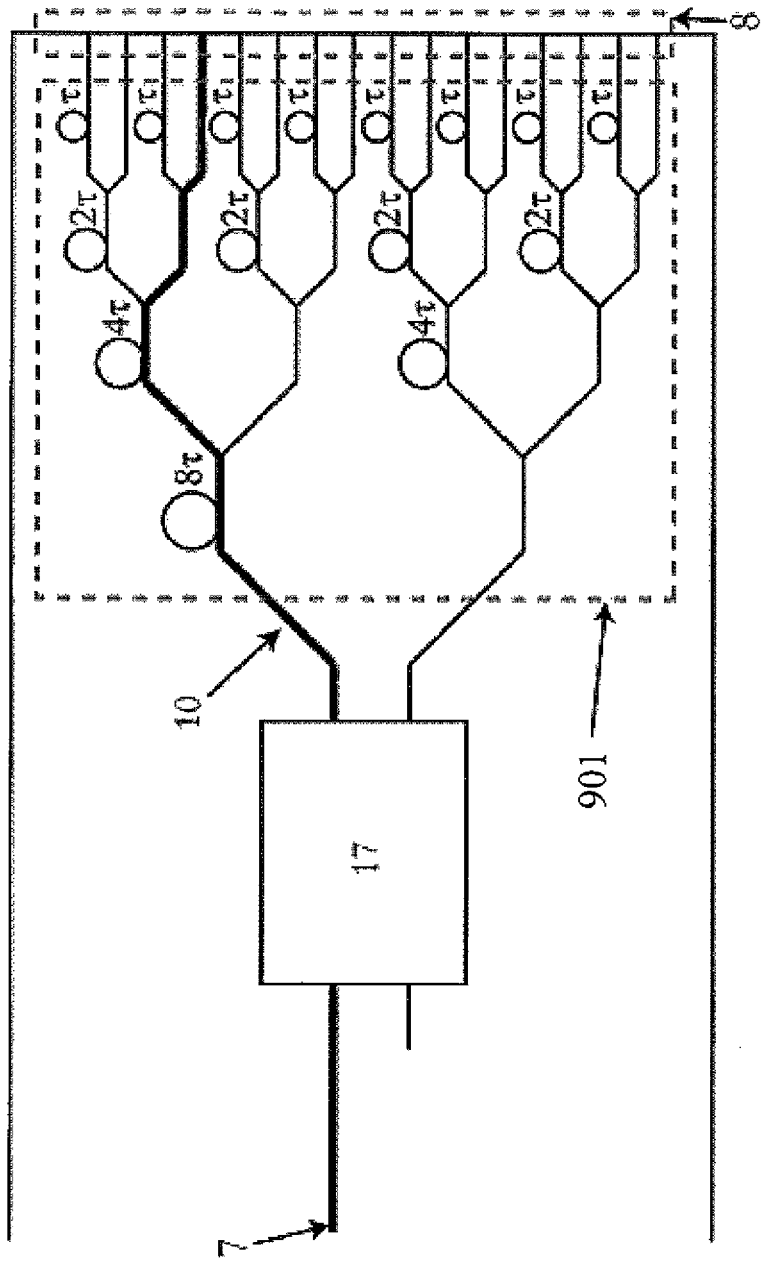

In another embodiment, coherence domain multiplexing may be used within second multiplexing unit 9, which leaves the task of separating lateral lines to the axial scan of the interferometric system. FIG. 9 illustrates the use of a coherence domain multiplexing unit 901 as an example of second multiplexing unit 9 together with first multiplexing system 17, according to an embodiment. This method uses trees of directional couplers with delays on every branch, such that when light reaches output waveguides 8, the various optical paths 10 have accumulated a unique delay for every output waveguide 8. In one example, the minimum spacing between the accumulated delays associated with the different output waveguides 8 is larger than the delay associated with the maximum sample depth from which optical contributions are expected.

Figure 10:
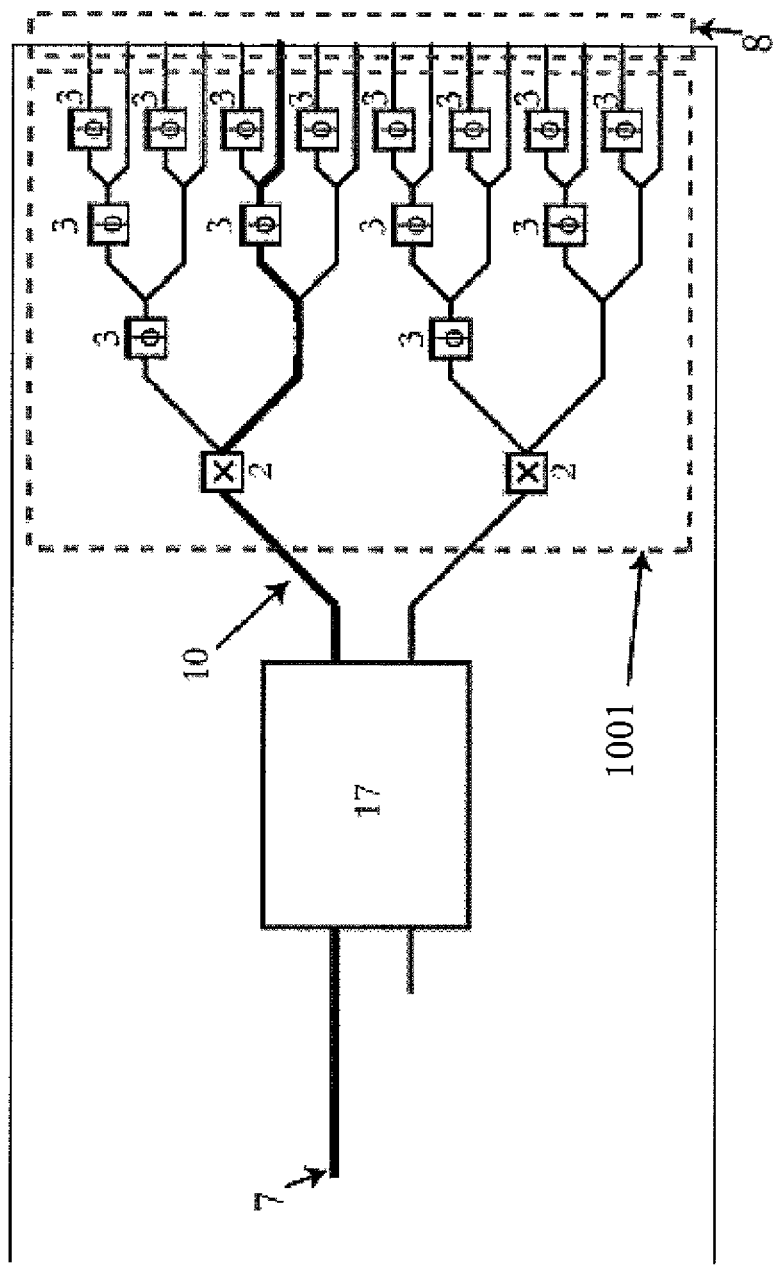
Figure 11:
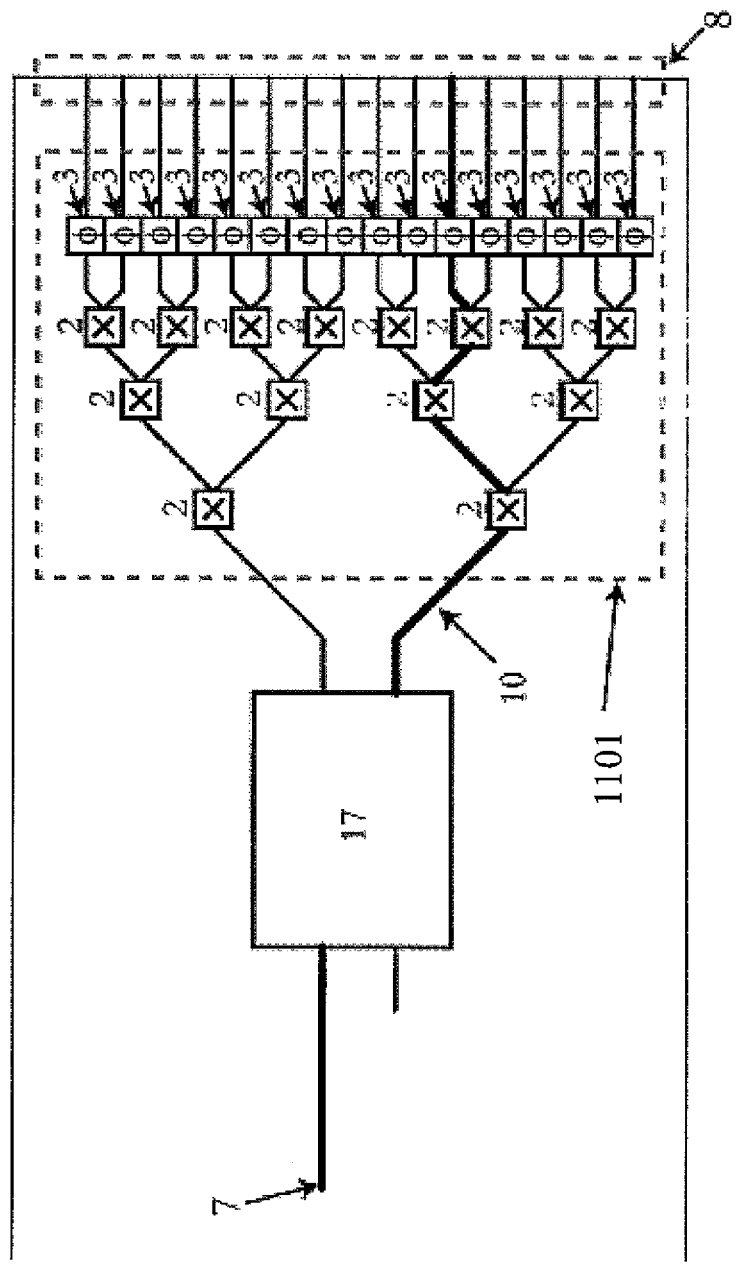

In an embodiment, combinations of any of the previously described multiplexing techniques may be utilized within second multiplexing unit 9. For example, frequency division multiplexing allows for parallel readout, but it is less efficient in terms of optical power budget, while time division multiplexing is better at conserving optical power. FIG. 10 illustrates a multiplexing unit 1001 that combines both optical switches 2 and optical modulators 3. In this example, optical switches 2 are placed at the first path divide while the optical modulators 3 are used at the various other optical paths formed after the first path divide.

As mentioned previously, optical switches 2 may not be ideal. This may lead to light leakage down optical paths that are different from the selected optical path 10. This can cause interference between independent lateral lines. The interference contribution may be minor if optical switch 2 has a reasonable performance, because of the accumulation of non-active optical path suppression in backward and forward directions. In one example, optical modulators 3 may be included before each output waveguide 8, as illustrated in multiplexing unit 1101 of FIG. 11. Optical modulators 3 may be phase modulating elements that apply a periodic excitation to shift the carrier of the interference pattern associated with each output waveguide 8 to a different frequency.

Figure 12:
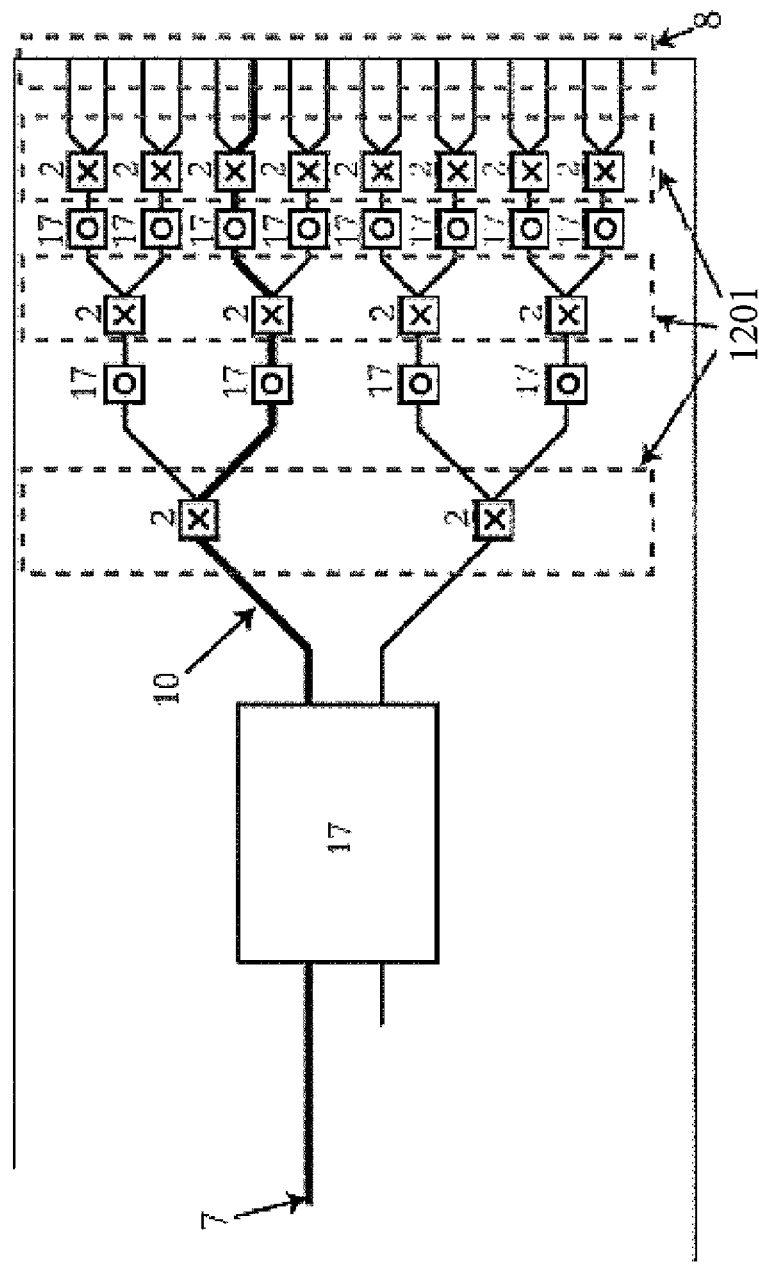

In an embodiment, second multiplexing unit 9 may include independent scan depth multiplexing units for each optical path. FIG. 12 illustrates a combination of time division multiplexing units 1201 with an additional first multiplexing unit 17 included on each optical path. First multiplexing unit 17 may be implemented using one or more of the examples illustrated in FIGS. 4-6. In this embodiment, a unique scan depth may be chosen for each output waveguide 8, while the various optical paths are all multiplexed during a lateral scan.

Due to factors such as the complexity of the integrated optical system, or the minimum spacing between output waveguides 8 necessary to avoid coupling between them, it may be possible that an adequate coverage of the lateral space for a scan cannot be reached for a given set of design constraints. Thus, in another embodiment, the beams produced from each output waveguide 8 may be steered to cover the scanning space with sufficient density.

Figure 13:
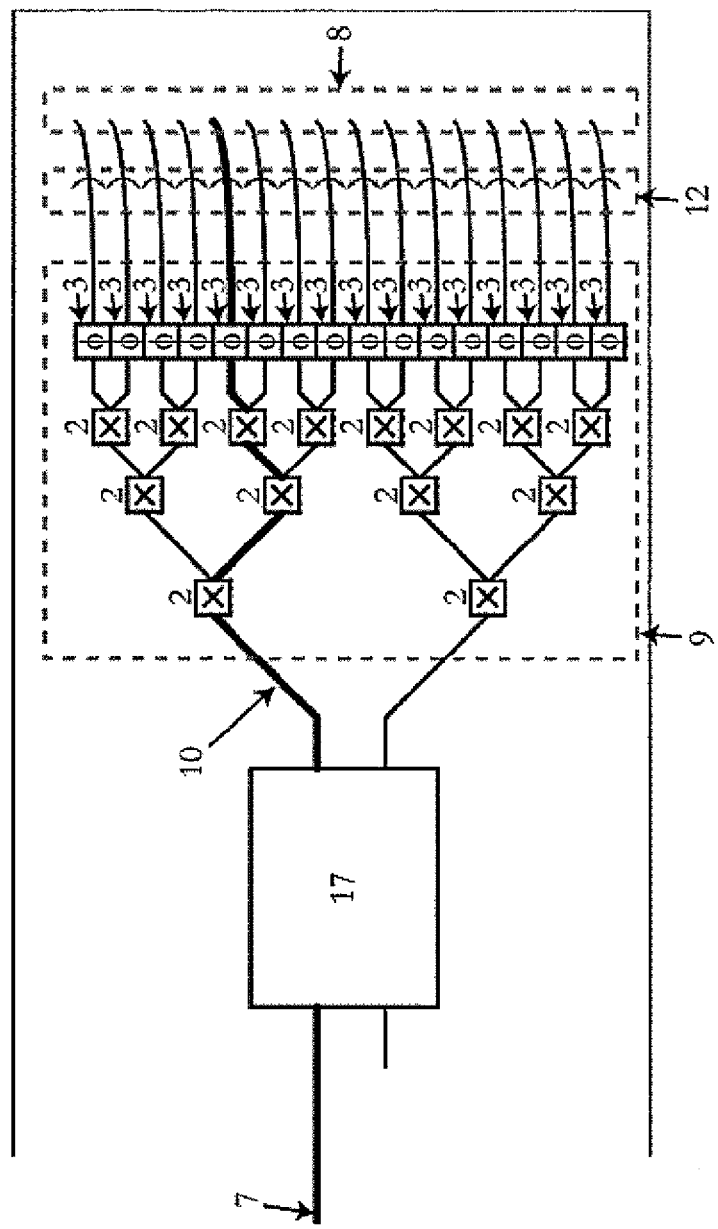
FIG. 13 illustrates the use of beam steering elements with the second multiplexing unit, according to an embodiment.

FIG. 13 illustrates an example including first multiplexing unit 17 and second multiplexing unit 9, where the radiation beams produced from each output waveguide 8 may be steered to exit the ends of output waveguides 8 at a specific angle via beam steering elements 12. Although a particular example of second multiplexing unit 9 is shown in FIG. 13, it should be understood that any other embodiment of second multiplexing unit 9 may be used as well.

A compromise may appear between the number of divisions using integrated optics and the lateral scan range of each output waveguide 8. In an embodiment, beam steering elements 12 are electromechanical components that are integrated to exert a force upon one or more of output waveguides 8. This can increase the lateral scan range of each output waveguide 8. Electromechanical elements 12 may be fabricated using, for example, microfabrication techniques and MEMS (Micro Electro-Mechanical System) concepts. In particular, using surface or volume micromachining, the output waveguides 8 may be released mechanically from the rest of the substrate, defining a mobile structure (e.g., cantilever beam or similar). Electromechanical elements 12 may include a force application element based on, for example, an electrostatic attraction/repulsion, temperature expansion, piezoelectric or other suitable principle. In another example, output waveguides 8 may be fabricated in a way to induce a particular stress gradient in the waveguide structure leading, to an inherent bend in the cantilever profile after being released from the substrate. It should be understood that although output waveguides 8 are illustrated in FIG. 13 to have an imparted curvature, this is only an example and should not be considered limiting.

According to an embodiment, the movement of output waveguides 8 can be either in the lateral scanning plane or in a plane perpendicular to it. As such, it is possible to obtain a 3D image without mobile elements external to the integrated optical substrate, since the lateral scan is performed by multiplexing the optical paths associated with different output waveguides 8, and the vertical scan is achieved by moving output waveguides 8 out of plane or otherwise directing the beam of light passing through output waveguides 8 out of plane.

Figure 14:
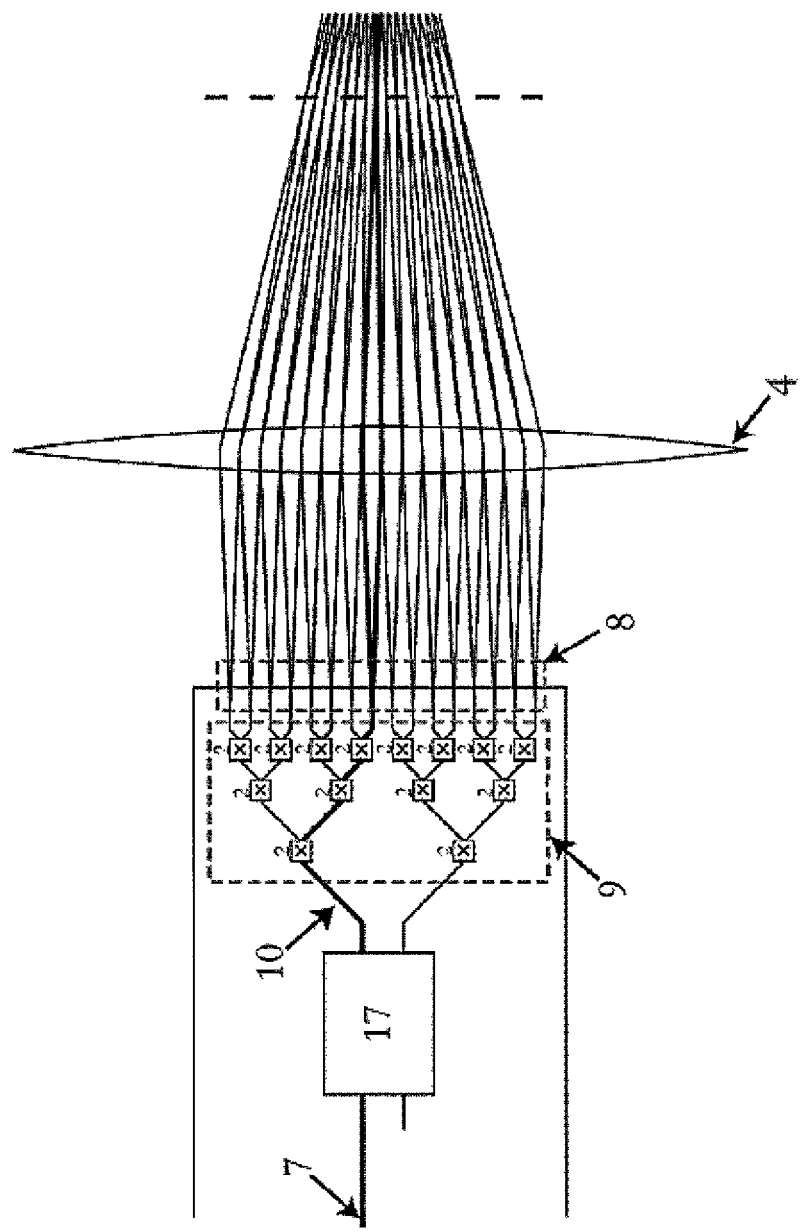
FIGS. 14-15 illustrate examples of using one or more optical elements to focus the light, according to embodiments.

FIG. 14 illustrates an example of scanning system 116 including first multiplexing unit 17 and second multiplexing unit 9. Scanning system 116 further incorporates a focusing optical element 4. In the embodiment shown, second multiplexing unit 9 uses time division multiplexing. However, second multiplexing unit 9 may also use any of the other techniques, or any combinations of techniques, discussed previously. In an embodiment, optical element 4 includes a single lens, but one of skill in the art will understand that any number of lenses may be used to achieve the desired focusing effect. A plurality of radiation beams is shown. All of the beams may be activated at once, as in the case of the frequency division multiplexing system. Alternatively, only a portion of the beams are activated in the case of a time division multiplexing system. In an embodiment, the spacing and lateral range of the array of output waveguides 8 are adjusted to the magnification specifications of optical element 4 and any potential sample specifications. In an embodiment, the distance between adjacent beams corresponding to different output waveguides 8 is sufficiently small compared to the diameter of the beams, such that the information gathered along the adjacent beams can be reorganized later as a two-dimensional or three-dimensional rendered image of the sample. In one example, the distance between adjacent beam centers is within 1-10 times the diameter of a single beam, when both this distance and this diameter are measured in the focal plane of optical element 4. The Full Width Half Maximum (FWHM) definition may be used, for example, for determining the diameter of the radiation beam.

Figure 15:
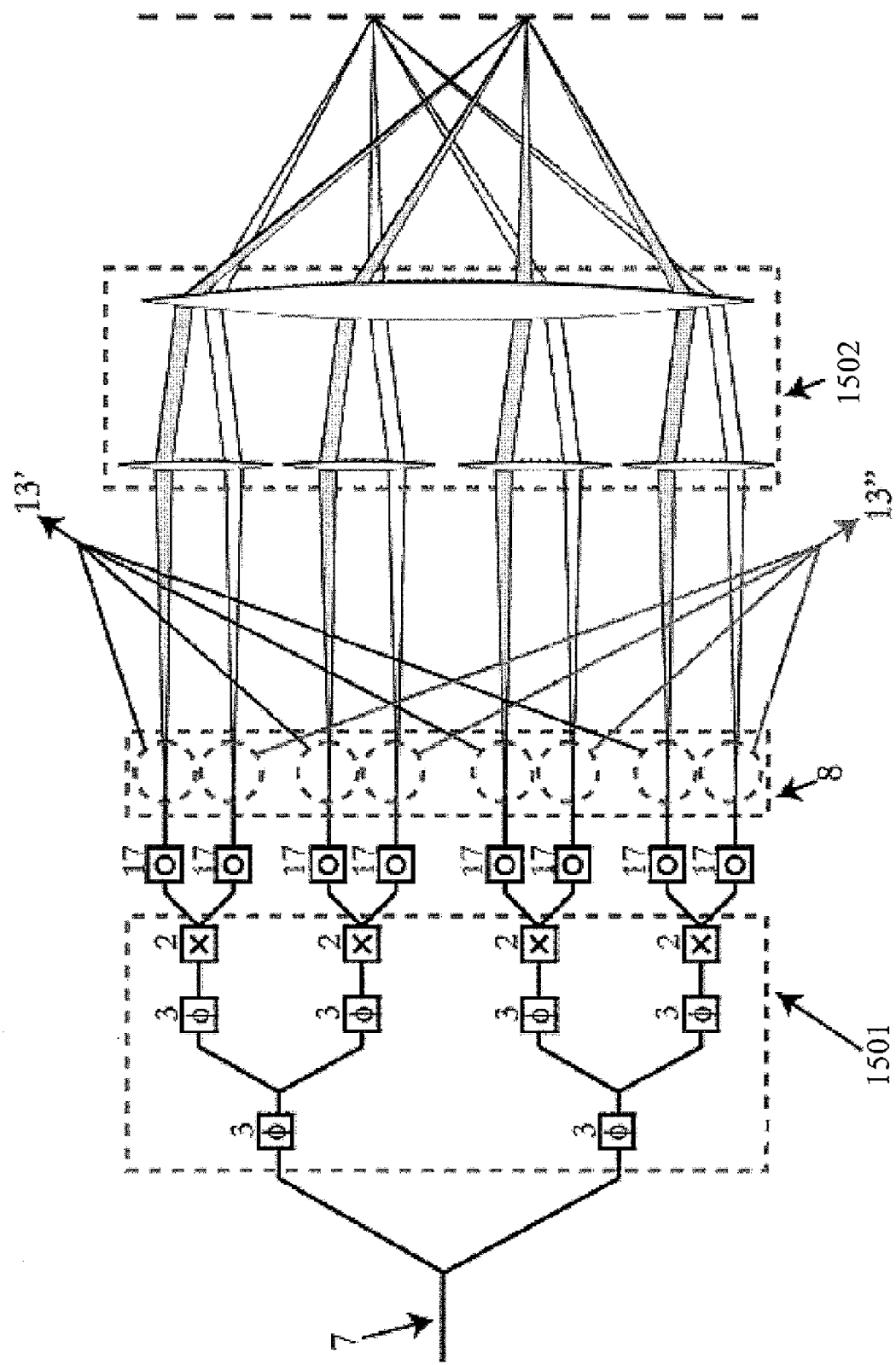

FIG. 15 illustrates another example of scanning system 116 that includes a combined multiplexing unit 1501 along with a first multiplexing unit 17 incorporated at each output. Similar to FIG. 12, a unique scan depth can be set for each output through the use of multiplexing units 17. In one example, combined multiplexing unit 1501 includes optical switches 2 to select a subset (either 13' or 13") of active optical paths. Also included are optical modulators 3 for multiplexing the paths in the selected subset 13', 13" of active optical paths, enabling simultaneous measurement of light contributions that have been scattered by the sample and collected by various output waveguides 8. First multiplexing units 17 actuate independently on each of the selected optical paths associated with each output waveguide 8, allowing independent control of the scanning depth for each output.

In order to direct the beams associated with various subsets 13', 13", optical focusing elements 1502 are included downstream of the output waveguides 8. In an embodiment, optical focusing elements 1502 include a plurality of lenses as illustrated to focus the beams associated with a given subset onto the same region of the target sample. For example, optical focusing elements 1502 include a single large lens and a plurality of smaller lenses, with each smaller lens configured to collect beams of radiation from each subset 13', 13". Although only two subsets 13', 13" of optical paths are illustrated, it should be understood that any number of subsets may be generated via combined multiplexing unit 1501. In an embodiment, the various beams in a given subset are considered to be directed at the same target region on the sample when the distance between the centers of each beam in the subset is lower than or equal to twice the diameter of each beam, when both this distance and this diameter are measured in the focal plane associated with optical focusing elements 1502. The Full Width Half Maximum (FWHM) definition may be used, for example, for determining the diameter of the radiation beam. The illustrated embodiment allows for measurements of the sample with spatial diversity, e.g., measuring the same region of the sample from different directions. This reduces the noise in the image.

The embodiment in FIG. 15 permits the acquisition of information on the angular dependency of the sample scattering function, as it is possible to measure the light that is scattered by a sample region in different directions relative to the direction of the incident light. For example, when one of the beams produced from an output waveguide 8 reaches the sample, part of the light will be scattered in different directions. The light that is scattered backwards relative to the incident light is redirected by optical focusing elements 1502 back to the original output waveguide 8. However, according to an embodiment, optical focusing elements 1502 are configured to direct the beams from any given subset 13', 13" towards the same sample region. Therefore, light scattered in directions other than directly backwards (relative to the incident light) may be directed by optical focusing elements 1502 to one of the other output waveguides 8 belonging to the subset 13', 13". The total path length traveled by the light from the point where it exits the device through an output waveguide 8 until it is collected by a different output waveguide 8, belonging to the same subset 13', 13", is different for each output waveguide 8 belonging to the subset 13', 13". In an embodiment, this path length difference is accounted for via the adjustable scan depth range on each optical path using first multiplexing unit 17. As such, this embodiment allows for the simultaneous measurement of light scattered in different directions for the same sample region in a single interferometer, and the angular dependency of the scattering function of the sample can be obtained.

Figure 16:
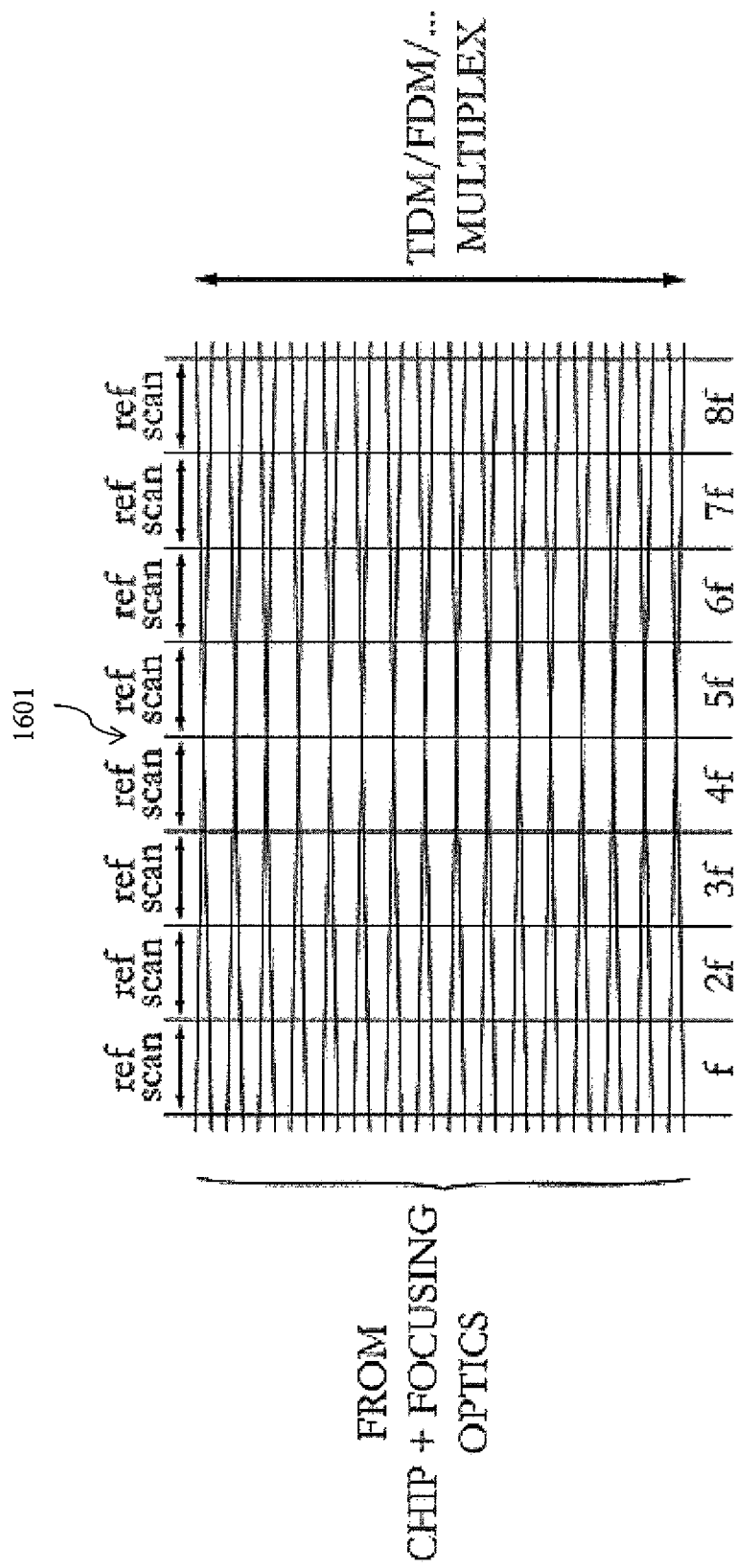
FIG. 16 illustrates a sample depth scanning technique according to an embodiment.

FIG. 16 illustrates an example technique for scanning a sample both axially and laterally, according to an embodiment. The beams are represented in geometrical optic approximation by two lines corresponding to the lateral extension of the optical energy. The lines intersect with each other at a first approximation at a focal plane 1601. The axial scan is performed using the OCT interferometric system described herein with the basic scanning range multiplication in multiplexed bands (for example, by using frequency division multiplexing). The diagonal lines that intersect pairwise represent light beams corresponding to each output waveguide 8, after focusing on the sample. The intersection points define focal plane 1601 associated with the lens system used. Laterally, time division, frequency division, or any other type of multiplexing is performed between the optical paths, as explained in previous embodiments. Axially, frequency division multiplexing may be chosen for selecting the scan depth in order to multiply the effect of the reference arm of an interferometric system. Thus, in embodiments, a scan is performed only within a specified section for a given frequency range (e.g., f, 2f, 3f, etc., as illustrated in FIG. 16).

Figure 17:
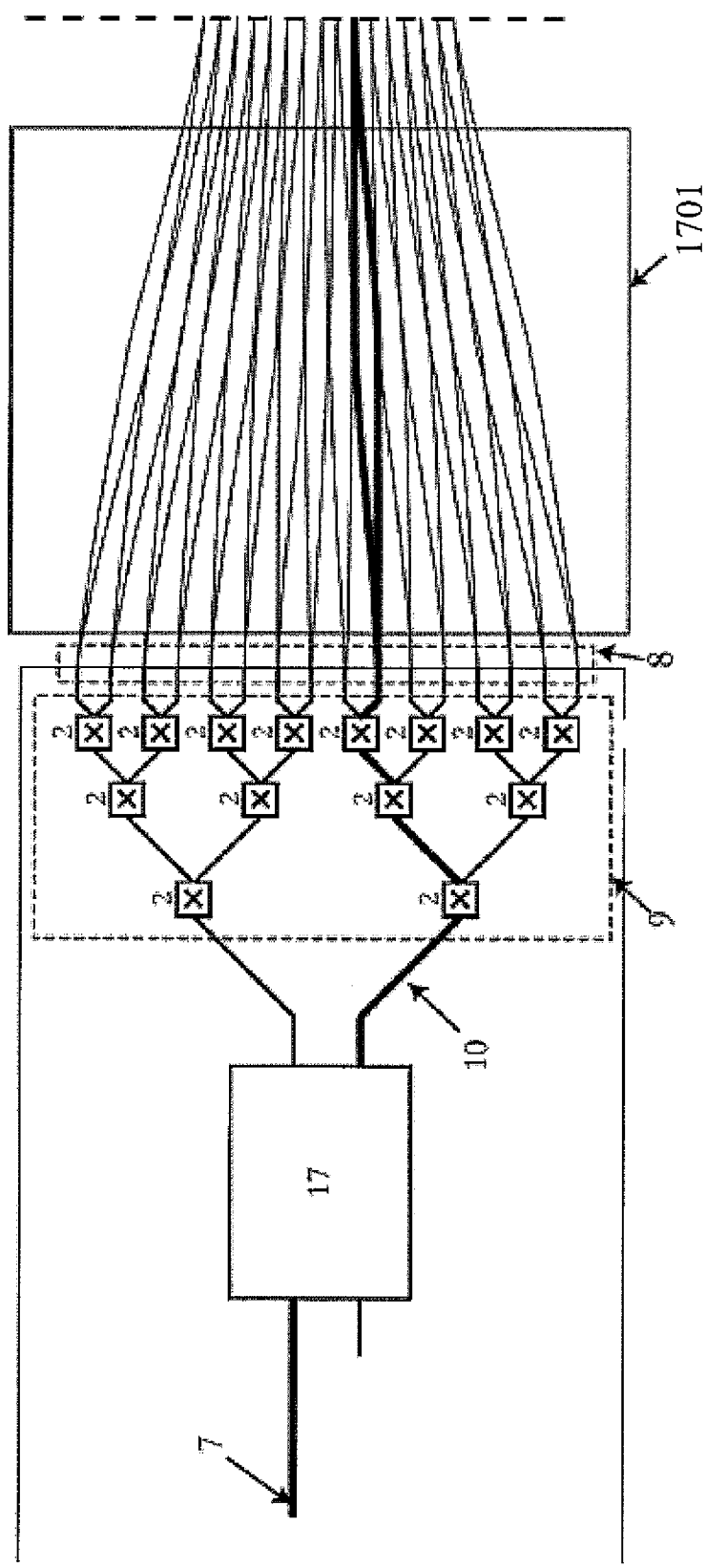
FIG. 17 illustrates the use of a gradient index lens with the multiplexing units, according to an embodiment.

Another embodiment of scanning system 116 is illustrated in FIG. 17. In an embodiment, a gradient index (GRIN) lens 1701 is included to focus the light from output waveguides 8 onto a sample. GRIN lens 1701 may be mounted contiguously to the same substrate associated with optical waveguides 8, or in a cavity etched into the substrate, where the various integrated waveguides are produced due to its compact size and substantially cylindrical shape. In another example, GRIN lens 1701 is monolithically integrated in the same substrate as output waveguides 8. The more compact assembly allows for the scanning system to be encapsulated with biocompatible and sterilization-ready materials to produce a medical sampling element, according to an embodiment. The medical sampling element may be inserted into a catheter, needle, or other device or medical instrument of small size, for the study of small tissues in areas that are typically difficult to access. As previously discussed with regards to other focusing elements, the distance between adjacent beams corresponding to different output waveguides 8 is sufficiently small compared to the diameter of the beams, such that the information gathered along the adjacent beams can be reorganized later as a two-dimensional or three-dimensional rendered image of the sample. In one example, the distance between adjacent beam centers is within 1-10 times the diameter of a single beam, when both this distance and this diameter are measured in the focal plane of GRIN lens 1701. The Full Width Half Maximum (FWHM) definition may be used, for example, for determining the diameter of the radiation beam.

FIGS. 18A-B illustrate a top and side view, respectively, of scanning system 116, according to an embodiment. In this embodiment, scanning system 116 includes a reflecting element 5 positioned downstream of GRIN lens 1701. In one example, reflecting element 5 is a right angle prism, as illustrated in FIG. 18B. In this example, reflecting element 5 may direct one or more incoming radiation beams in a direction perpendicular to the initial beam direction from output waveguides 8. In an embodiment, scanning system 116 as embodied in FIG. 18A may be mounted in a catheter, where small movements of the device along a guide wire can be used to provide a 3D rendering of a blood vessel wall under study. Reflecting element 5 may be a separate component from the rest of scanning system 116. Alternatively, reflecting element 5 may be integrated into the same substrate as either output waveguides 8 or GRIN lens 1701. In another example, all of the illustrated elements may be monolithically integrated in the same substrate.

Figure 19A:
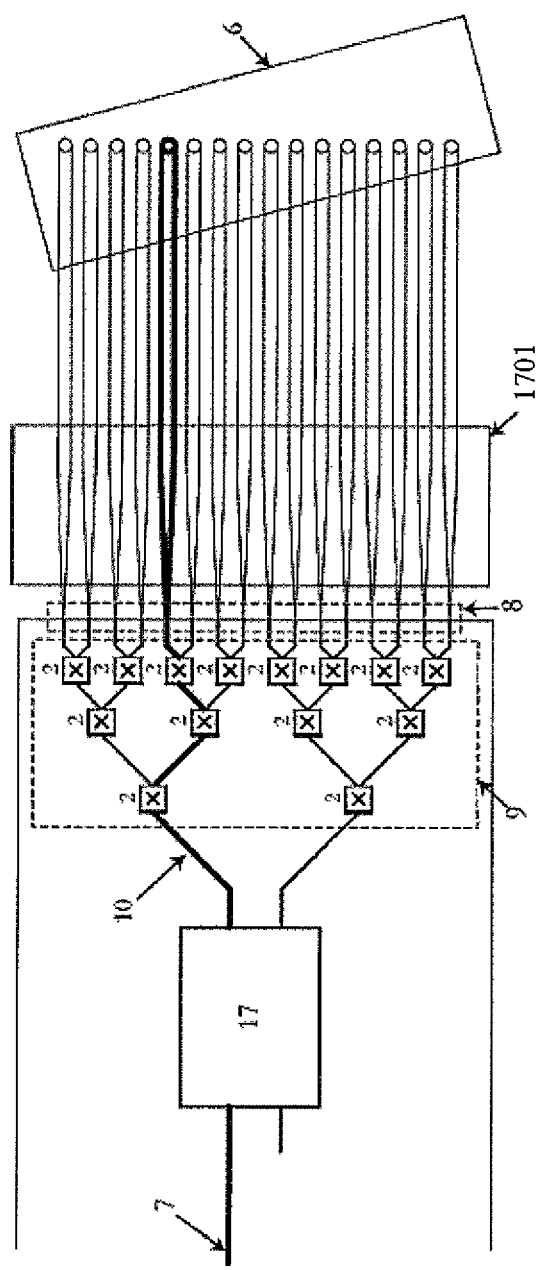
Figure 19B:
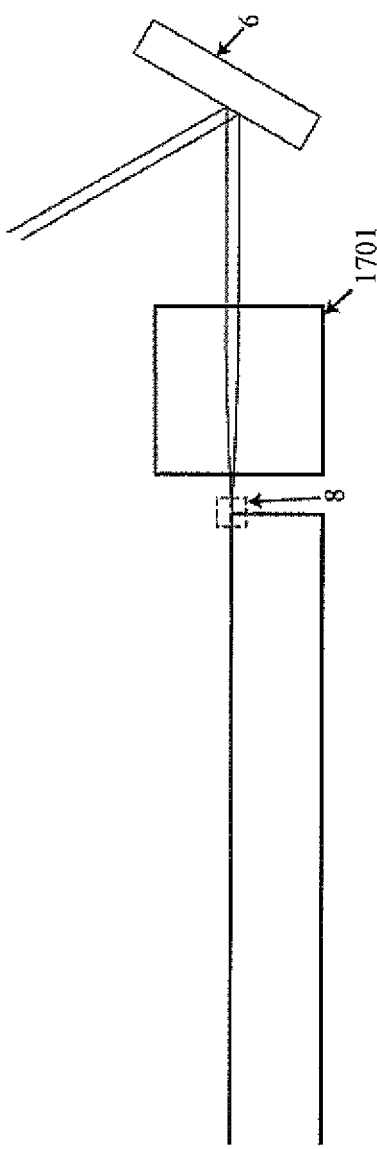

FIGS. 19A-B illustrate a top and side view, respectively, of scanning system 116, according to an embodiment. In this embodiment, scanning system 116 includes an adjustable reflecting element 6 positioned downstream of GRIN lens 1701. In one example, adjustable reflecting element 6 is a mechanically adjustable reflector. The inclusion of adjustable reflecting element 6 allows for the generation of 3D images with only a single low-speed scanning axis, instead of having two. Indeed, the need for providing a high-speed scan of the sample is removed in such an embodiment, only serving for the orientation of the group of beams to the area to scan, or for providing the slow direction in a three-dimensional scan. Thus, to generate 3D images, only a single low-speed scanning axis is needed, instead of two, according to an embodiment. Adjustable reflecting element 6 may adjust the reflected angle of the incoming beams of radiation via any suitable means, as would be known to one having skill in the relevant art(s). For example, adjustable reflecting element 6 may use coupled piezoelectric actuators or electrostatic actuation, or mechanical rotation to adjust the orientation of adjustable reflecting element 6.

FIGS. 20A-B illustrate a top and side view, respectively, of scanning system 116, according to an embodiment. In this embodiment, scanning system 116 includes an adjustable reflector array 2001. Adjustable reflector array 2001 may be used to probe multiple images from various target regions of a sample. In an embodiment, each produced beam of radiation is associated with one reflecting element in adjustable reflector array 2001. Each element can be individually moved to change the reflection angle of the incoming associated radiation beam. This allows for a situation where each beam of radiation is targeted towards a different region of a sample.

In an embodiment, adjustable reflector array 2001 includes MEMS devices such as adjustable micro-mirrors. The micro-mirrors may be fabricated using conventional microfabrication techniques and integrated in the same substrate as either output waveguides 8 or GRIN lens 4. In another embodiment, adjustable reflector array 2001 may be fabricated on a separate substrate and flip-chip bonded to the substrate that includes output waveguides 8 and GRIN lens 4. If each of the reflecting elements in adjustable reflector array 2001 provides independent transversal scanning, then the scanning system is capable of, for example, obtaining a large number of images either sequentially or simultaneously.

It should be understood that for the embodiments described above, the use of GRIN lens 1701 may be replaced by other suitable optical focusing elements to achieve the same result. Furthermore, although second multiplexing unit 9 is illustrated in the embodiments shown in FIGS. 17-20 as using time division multiplexing, it should be understood that any multiplexing technique, or combination of techniques, as described previously could also be used.

Although the above embodiments have been described in the context of an OCT system, any of the various embodiments described above can also be applied to other applications. For example, any of the various embodiments described above can be applied to the optical reading of data stored in multilayer optical systems, where the selection between the layers is performed by detection systems based on an optical coherence gating. One example advantage provided in this case is the increase in reading speed, when the reading is (quasi-) simultaneous on a large number of optical tracks. It is also to be noted that any of the embodiments described above are susceptible to modifications of detail, provided that they do not alter the fundamental principle and the essence of the invention.

FIG. 21 illustrates an example method 2100 for performing lateral scanning, according to an embodiment. Method 2100 may be performed, for example, by any of the various embodiments described above for scanning system 116.

At step 2102, a beam of radiation is received at a first multiplexing unit. The first multiplexing unit may be, for example, any one of the multiplexing units described in regards to FIGS. 4-6.

At step 2104, a group delay is introduced to the beam of radiation received at the first multiplexing unit based on an optical path traversed by the beam of radiation received at the first multiplexing unit among a first plurality of optical waveguides in the first multiplexing unit. The group delay may be introduced in a variety of ways, such as by using waveguide segments of different lengths or waveguide segments allowing modification of the refractive index by effects such as thermo-optical, electro-optical, charge injection, etc. In one example, optical modulating elements and/or optical switches are used to differentiate the beam among a plurality of paths, with each path having a unique group delay associated with it.

At step 2106, a beam of radiation is received by a second multiplexing unit. The beam of radiation received by the second multiplexing unit may be the same beam of radiation received by the first multiplexing unit, such as when the first multiplexing unit is located in the sample arm. Alternatively, the beam of radiation received by the second multiplexing unit may be different from the beam of radiation received by the first multiplexing unit, such as when the first multiplexing unit is located in the reference arm. The second multiplexing unit may be, for example, any of the various multiplexing units described in regards to FIGS. 7-13 or FIG. 15.

At step 2108, the beam of radiation received by the second multiplexing unit is differentiated among a second plurality of optical waveguides to produce one or more output radiation beams. The beam of radiation received by the second multiplexing unit may be differentiated among a variety of optical paths using any one, or a combination of, time division multiplexing, frequency division multiplexing, coherence domain multiplexing, etc.

At step 2110, the one or more output radiation beams are guided towards a sample. The guiding may include focusing and/or redirecting the light, as described in the embodiments illustrated in, for example, FIGS. 14-15 and FIGS. 17-20.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A low coherence interferometry system comprising:
    a first multiplexer configured to receive a first beam of radiation and comprising a first plurality of optical delay elements configured to introduce a group delay to the first beam of radiation based on an optical path traversed by the first beam of radiation among a first plurality of optical waveguides; and
    a second multiplexer configured to receive a second beam of radiation, and comprising a second plurality of optical modulators configured to differentiate the second beam of radiation among a second plurality of optical waveguides to produce one or more output radiation beams,
    wherein the second plurality of optical waveguides are configured to guide the one or more output radiation beams towards a sample.

2. The low coherence interferometry system of claim 1, wherein the first multiplexer further comprises a plurality of switches configured to select the optical path traversed by the first beam of radiation among the first plurality of optical waveguides.

3. The low coherence interferometry system of claim 1, wherein the first multiplexer further comprises a plurality of phase modulators.

4. The low coherence interferometry system of claim 1, wherein the second multiplexer is configured to receive the second beam of radiation from a single output of the first multiplexer.

5. The low coherence interferometry system of claim 1, wherein the second multiplexer is configured to receive the second beam of radiation from one of only two outputs of the first multiplexer.

6. The low coherence interferometry system of claim 1, further comprising an optical element disposed between the second multiplexer and the sample.

7. The low coherence interferometry system of claim 6, wherein the optical element is a single lens.

8. The low coherence interferometry system of claim 7, wherein the single lens is configured to focus the one or more output radiation beams onto a focal plane such that a distance between centers of adjacent beams at the focal plane is between 1 and 10 times larger than the diameter of one of the beams at the focal plane.

9. The low coherence interferometry system of claim 7, further comprising a plurality of lenses, each smaller than the single lens, configured to focus at least one subset of the one or more output radiation beams onto a first target region of the sample and focus at least one other subset of the one or more output radiation beams onto a second target region of the sample.

10. The low coherence interferometry system of claim 6, wherein the optical element is a gradient index (GRIN) lens.

11. The low coherence interferometry system of claim 6, further comprising a reflector disposed downstream of the optical element and configured to alter a direction of propagation of the one or more output radiation beams.

12. The low coherence interferometry system of claim 11, wherein the altered direction of propagation is substantially perpendicular to an original direction of propagation.

13. The low coherence interferometry system of claim 11, wherein an orientation of the reflector is adjustable, such that an angle of alteration to the direction of propagation of the one or more output radiation beams is adjustable.

14. The low coherence interferometry system of claim 13, wherein the adjustable reflector comprises microelectromechanical components.

15. The low coherence interferometry system of claim 1, wherein the second plurality of optical modulators comprises phase modulators.

16. The low coherence interferometry system of claim 1, wherein the second plurality of optical modulators comprises optical delay elements.

17. The low coherence interferometry system of claim 1, wherein the second plurality of optical modulators comprises optical switches.

18. The low coherence interferometry system of claim 1, wherein the group delay is associated with a scanning depth of the sample and is carried through to the one or more output radiation beams in the second multiplexer.

19. The low coherence interferometry system of claim 1, wherein the second plurality of optical waveguides are further configured to collect scattered radiation from the sample.

20. The low coherence interferometry system of claim 1, wherein the first plurality of optical waveguides and the second plurality of optical waveguides are integrated on a same substrate.

21. The low coherence interferometry system of claim 1, further comprising microelectromechanical actuators configured to bend one or more of the second plurality of optical waveguides.

22. The low coherence interferometry system of claim 1, wherein the second beam of radiation is different from the first beam of radiation.

23. The low coherence interferometry system of claim 22, wherein the first multiplexer is located in a reference arm of the low coherence interferometry system and the second multiplexer is located in a sample arm of the low coherence interferometry system.

24. The low coherence interferometry system of claim 1, wherein the second beam of radiation is the same as the first beam of radiation.

25. The low coherence interferometry system of claim 24, wherein the first multiplexer and the second multiplexer are both located in a sample arm of the low coherence interferometry system.

26. A method performed by a low coherence interferometry system, comprising:
 receiving a first beam of radiation at a first multiplexer;
 introducing a group delay to the first beam of radiation received at the first multiplexer based on an optical path traversed by the first beam of radiation received at the first multiplexer among a first plurality of optical waveguides in the first multiplexer;
 receiving a second beam of radiation at a second multiplexer;
 differentiating the second beam of radiation received at the second multiplexer among a second plurality of optical waveguides to produce one or more output radiation beams; and
 guiding the one or more output radiation beams towards a sample.

27. The method of claim 26, further comprising modulating a phase of the first beam of radiation in the first multiplexer.

28. The method of claim 26, wherein the differentiating the second beam of radiation comprises introducing a delay to the second beam of radiation.

29. The method of claim 26, wherein the differentiating the second beam of radiation comprises switching the second beam of radiation among the second plurality of optical waveguides.

30. The method of claim 26, wherein the differentiating the second beam of radiation comprises modulating a phase of the second beam of radiation.

31. The method of claim 26, further comprising focusing the one or more output radiation beams via an optical element.

32. The method of claim 31, further comprising altering a propagation direction of the one or more output radiation beams via a reflector disposed downstream of the optical element.

33. The method of claim 26, further comprising bending one or more of the second plurality of optical waveguides via microelectromechanical actuators.

34. The method of claim 26, further comprising collecting scattered radiation from the sample.

35. The method of claim 26, wherein the second multiplexer receives the second beam of radiation from the first multiplexer.

36. The method of claim 26, wherein the second beam of radiation received at the second multiplexer is the same as the first beam of radiation received at the first multiplexer.

37. The method of claim 26, wherein the second beam of radiation received at the second multiplexer is different from the first beam of radiation received at the first multiplexer.

* * * * *